United States Patent [19]

Gunderson

[11] 4,029,913
[45] June 14, 1977

[54] REMOTE ACCESSING SYSTEM FOR TELEPHONE LINES

[75] Inventor: Richard A. Gunderson, Eden Prairie, Minn.

[73] Assignee: Magnetic Controls Company, Minneapolis, Minn.

[22] Filed: Mar. 31, 1976

[21] Appl. No.: 672,406

[52] U.S. Cl. .................................. 179/175.3 R
[51] Int. Cl.² ........................................ H04B 3/46
[58] Field of Search ............ 179/175.3 R, 175.2 R, 179/175.31 R

[56] References Cited
UNITED STATES PATENTS

| | | | |
|---|---|---|---|
| 3,410,966 | 11/1968 | Davies | 179/175.3 R |
| 3,506,794 | 4/1970 | Chulak | 179/175.3 R |
| 3,705,275 | 12/1972 | Leyburn et al. | 179/175.3 R |
| 3,842,218 | 10/1974 | De Luca et al. | 179/175.3 R |

Primary Examiner—Douglas W. Olms
Attorney, Agent, or Firm—Neil B. Schulte

[57] ABSTRACT

A system for electronically selecting and establishing test loop circuits between a remote test position and any of a large number of communication lines at an access location. Extensive logic circuits at the access end and the test end exchange information and display for the operator if the circuit is ready, if there has been a transmission error or component failure, if the circuits are busy, and other factors that affect the system thereby making the operator's task easier. Fail safe circuits prevent opening of telephone lines by access circuitry malfunctions.

29 Claims, 29 Drawing Figures

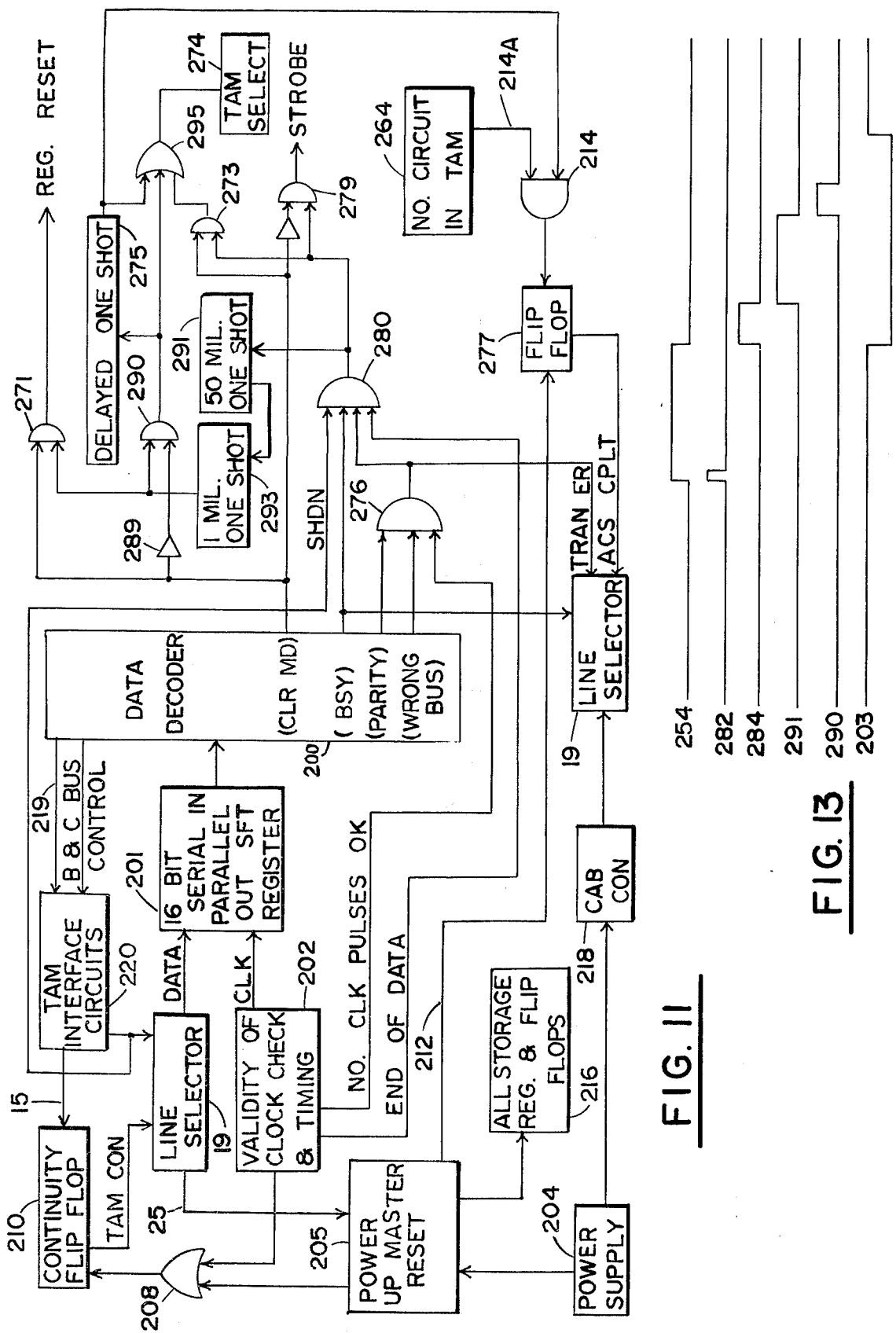

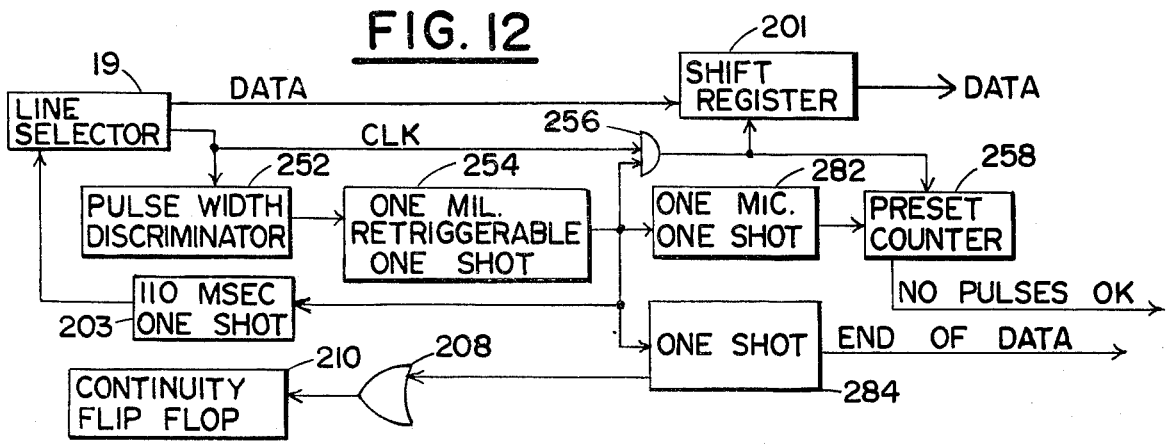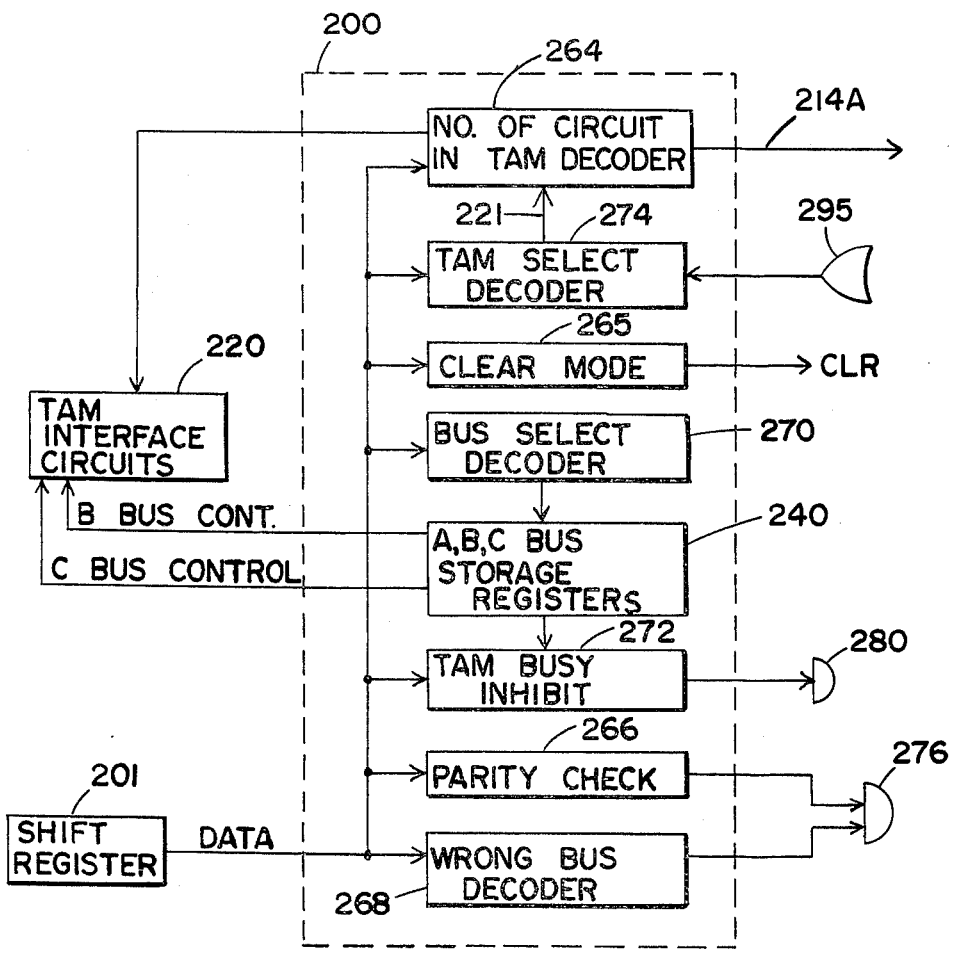

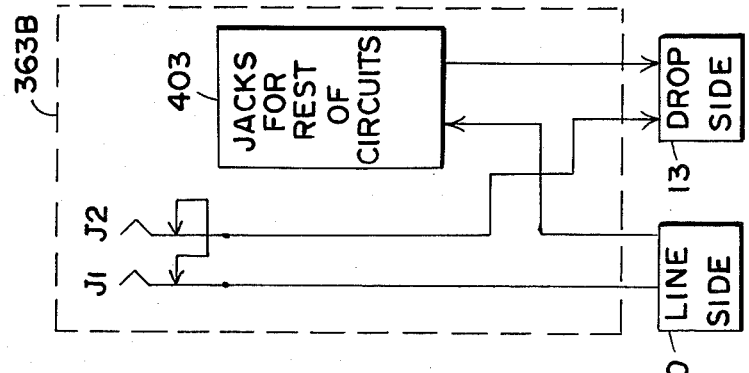
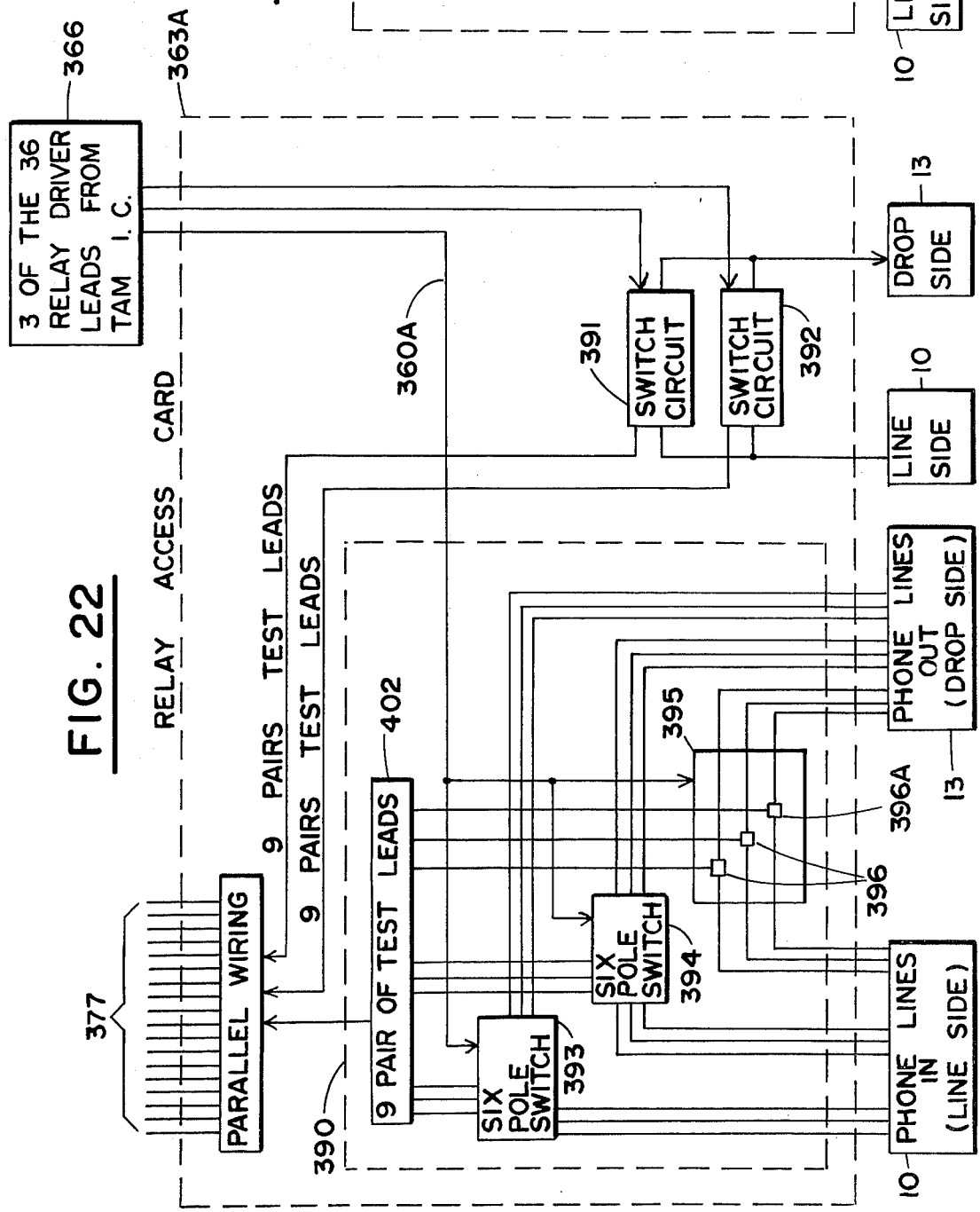

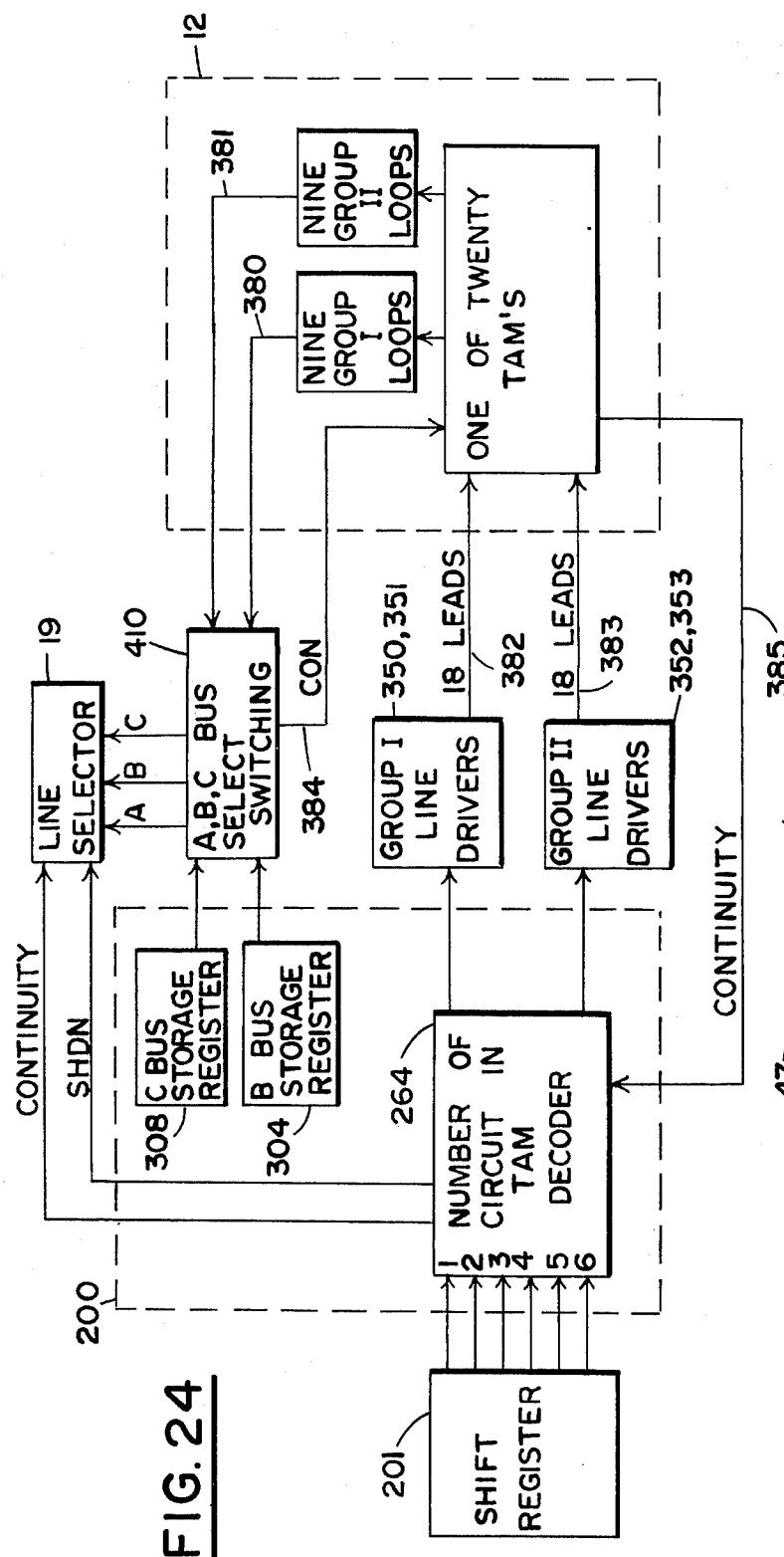

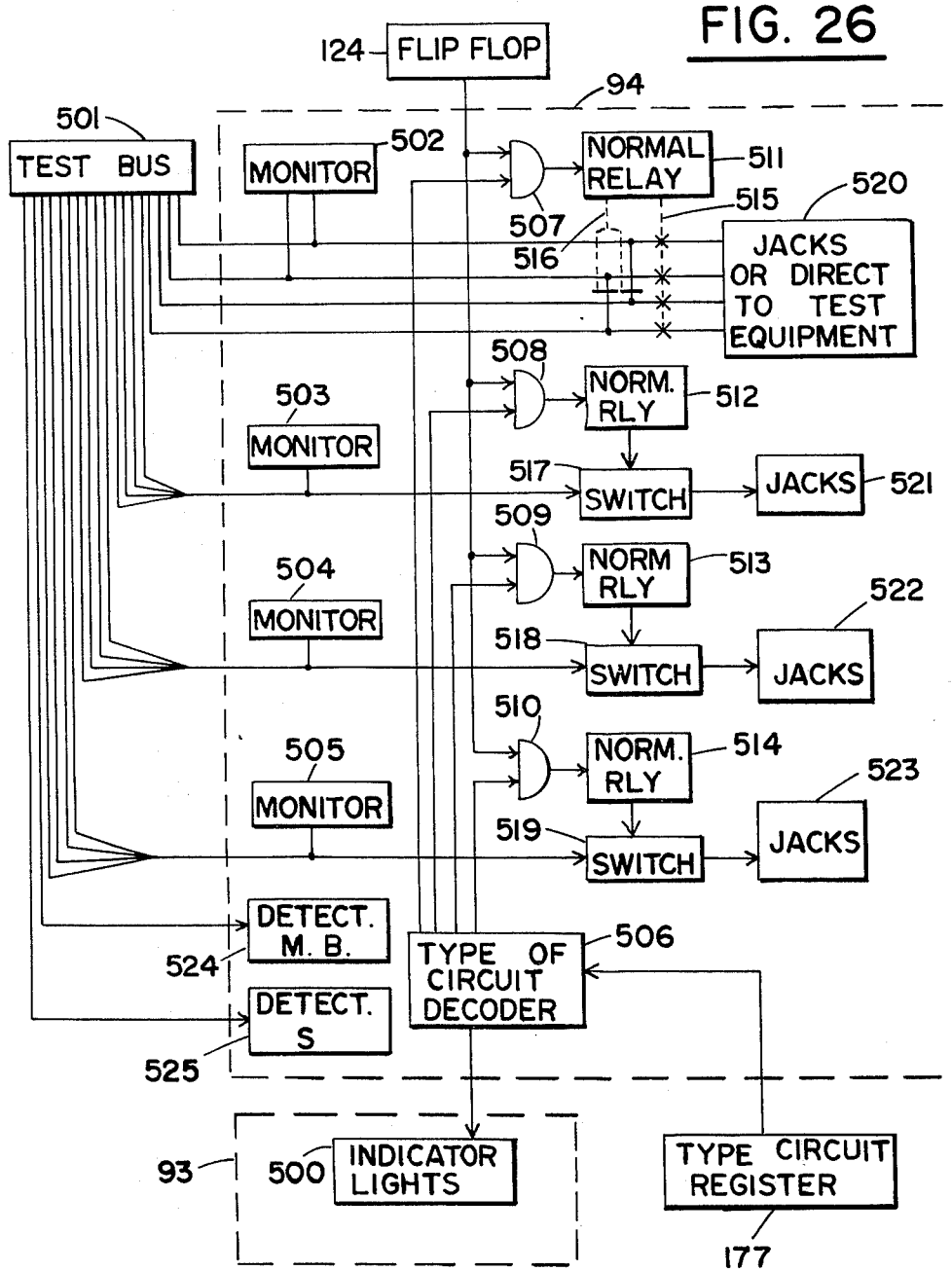

REMOTE ACCESSING SYSTEM FOR TELEPHONE LINES

BACKGROUND OF THE INVENTION

It is common to test telephone lines of the two, four, and six wire types by connecting a test board to the lines and transmitting or measuring signals thereover. As a rule it is inconvenient to perform these tests right at the communication lines themselves and therefore a test position is usually established at a remote test center. Past practice has been to route test loops from the distribution frames to jackfields at the test center, but as the telephone lines have grown in number this has become impractical. Accordingly, the prior art recognizes systems to selectively tap the communication lines at a suitable access point and route them through suitable test loops to the testing position. To do this it is necessary to be able to remotely select the desired communication line and make a connection to it at the access point. Such a system is disclosed in the G. A. Barbary et al. U.S. Pat. No. 3,525,822.

This prior art system utilizes an electromechanical cross bar switching system which is expensive, slow and limited in the number of access functions that can be performed. The present invention contemplates a digital solid state electronic system for selecting and accessing communication circuits remotely which is more efficient and can be expanded to accomodate thousands of communication lines as described hereinafter.

SUMMARY OF THE INVENTION

Briefly, the present invention permits the operation of a test center which can incorporate a plurality of test positions. The operator at each position has a control panel that allows him to access circuits associated not only with his test position but also circuits which are assigned to other test positions. If the operator wishes to connect his test board to a circuit which is experiencing some problem, he enters the code for the particular circuit on a keypad. In response to the entry of this data the automatic electronic circuits at the test position sequentially review a number of status lines to determine if the test loops are busy or available for use, whether the address bus is busy, and whether the circuitry at the access end is ready to receive data. If there is a problem the electronic circuits at the test position halt the process and inform the operator what the problem is. If no problems are found the process continues and the coded data indicating the circuit required is sent out to the access location. An electronic decoding and switching system automatically makes a connection between the test position and the desired communication lines if the switching circuits are not already in use and if all connections to the switching equipment are properly made. Any inproper operation of the equipment is detected and displayed to the operator at the test position. The desired communication line is connected through one of three test buses to the test position. The operator can then connect his test equipment to the accessed communication line and perform the appropriate tests. The actual test equipment is not a subject of this invention and is not described herein.

It may therefore be seen that it is an object of my invention to provide an improved digital solid state communication line accessing system which can loop selected communication lines to testing points with compact, highly reliable, modular circuitry which system can be expanded to access thousands of circuits.

It is a further object of my invention to provide such an accessing system which is automatic in many of its functions so that a minimum of training is necessary for the operator who will be using the system.

It is a further object of my invention to provide an accessing system which is fail safe in case of a loss of power to the system or a malfunction in the access driver circuitry. Further objects and advantages will become apparent from the following description and drawings.

BRIEF DESCRIPTION OF THE DRAWINGS

To facilitate an easy understanding of the complex electronic circuits described herein the drawings have been arranged sequentially to first provide overall system descriptions followed by more detailed explanations of the individual components within the overall system. Thus, for example, FIG. 4 then shows one of the subcomponents of FIG. 3 in greater detail and so on.

To conserve space on the drawings abbreviations are extensively employed. Whenever one of these are encountered the meaning should be apparent but the exact meaning can be ascertained by reference to the following table of abbreviations:

| | |
|---|---|
| Access | ACS |
| Test Access Module | TAM |
| Test Access Module Continuity | TAM CON |
| Cable Continuity | CAB CON |
| Shutdown | SHDN |
| Busy | BSY |
| Transmission Error | TRAN ER |
| Ready | RDY |
| Clock | CLK |
| Sequencer | SEQ |
| Enable | ENBL |
| Reset | RST |
| Remote Reset | RM RST |
| Address Transmission Enable | AD TRN ENBL |
| Address Bus Busy | AD BUS BSY |
| Optical Isolator | O I |
| Relay | RLY |
| Keypad | KPD |
| Circuit | CKT |
| Clear | CLR |
| Circuit Clear Complete | CKT CLR CPLT |
| Start Command Reset | STRT COM RST |
| Inhibit | INHBT |
| Alternate Test Position | ALT TST POS |
| Line Selector | L S |
| Indicator | IND |
| Keypad Address Present | KPD AD PRS |
| Logic | LOG |
| Shift Register | SFT REG |

Figure 1:
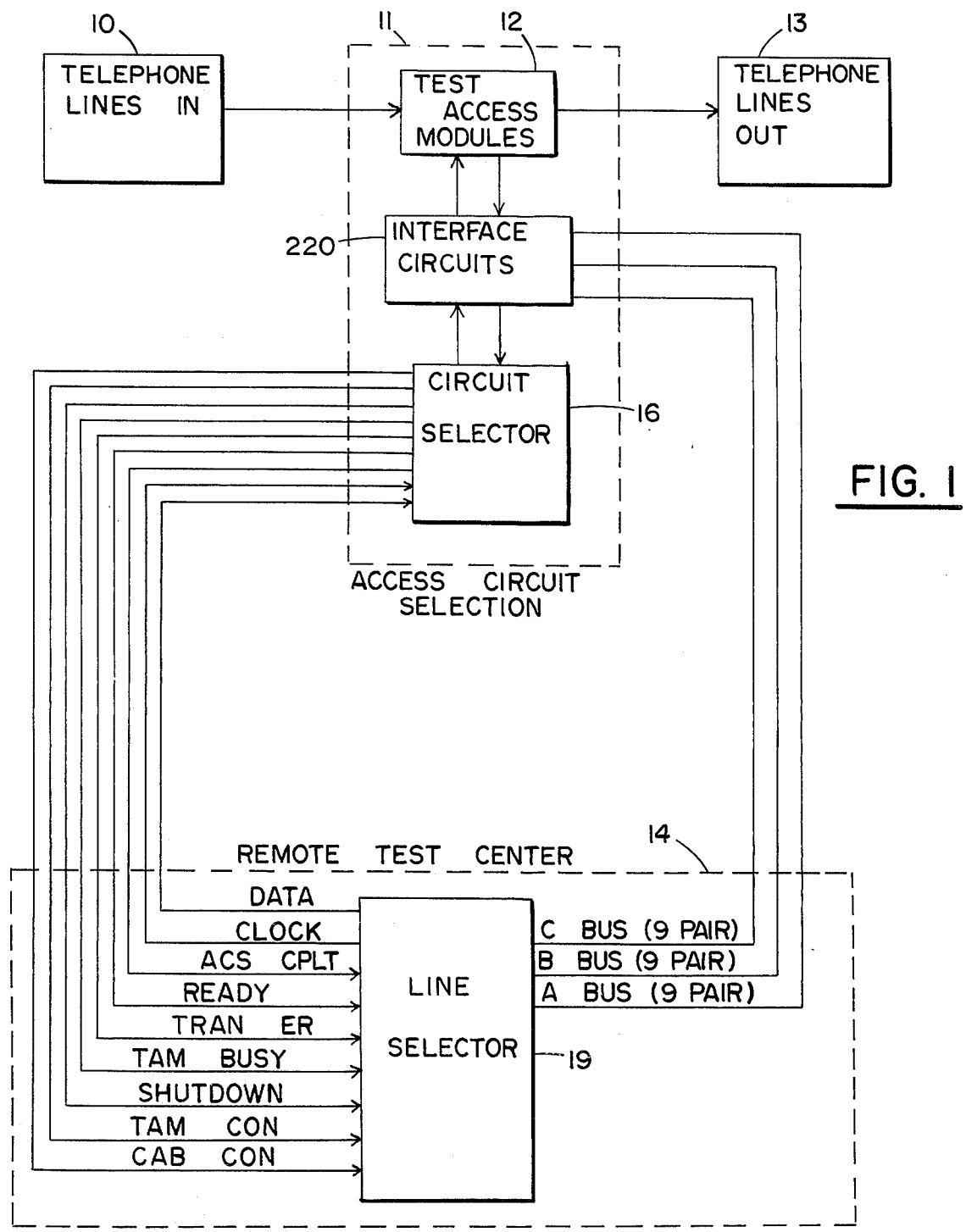

FIG. 1 schematically shows the overall system including both the access location and the test facility.

Figure 2:
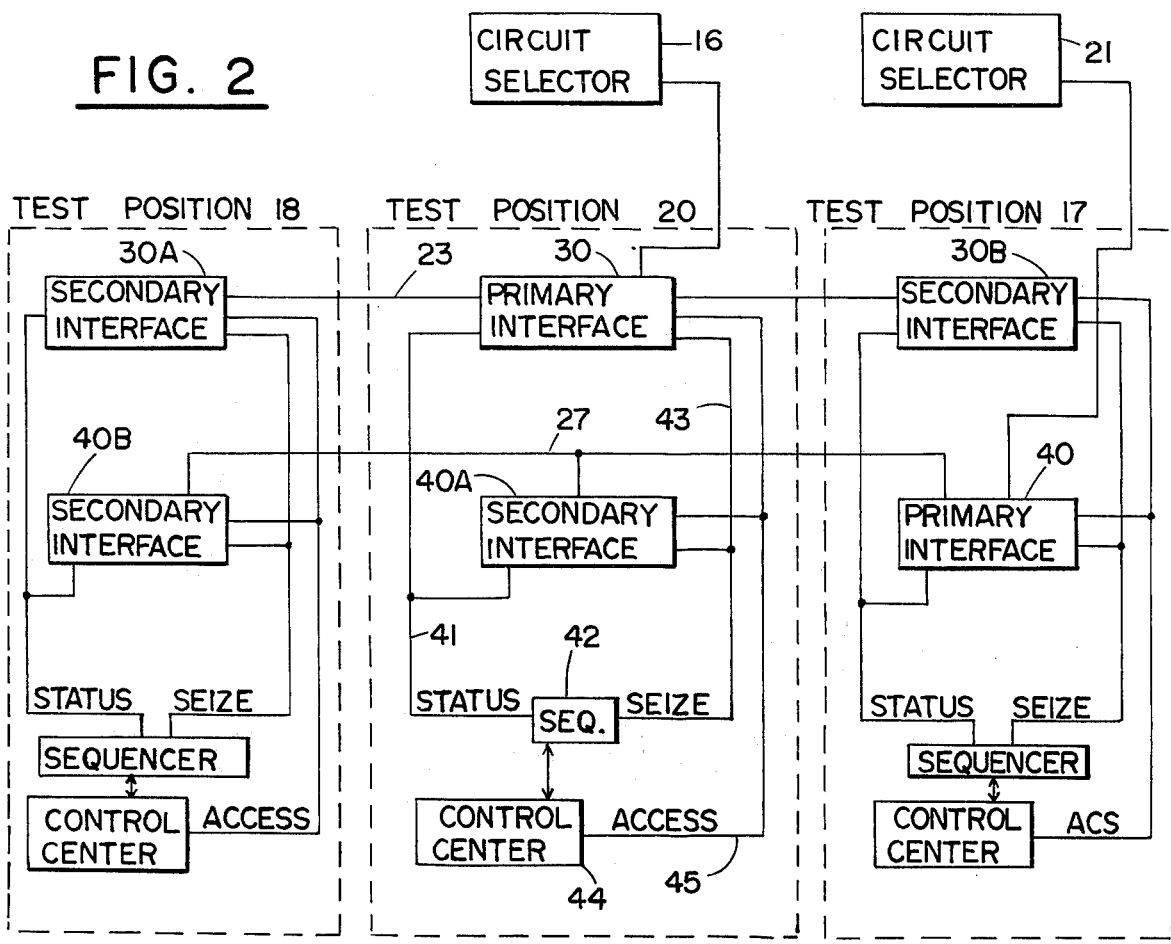
FIG. 2 shows a test facility involving three test positions while the following

FIG. 2 schematically shows the test facility with three test positions therein.

Figure 3:
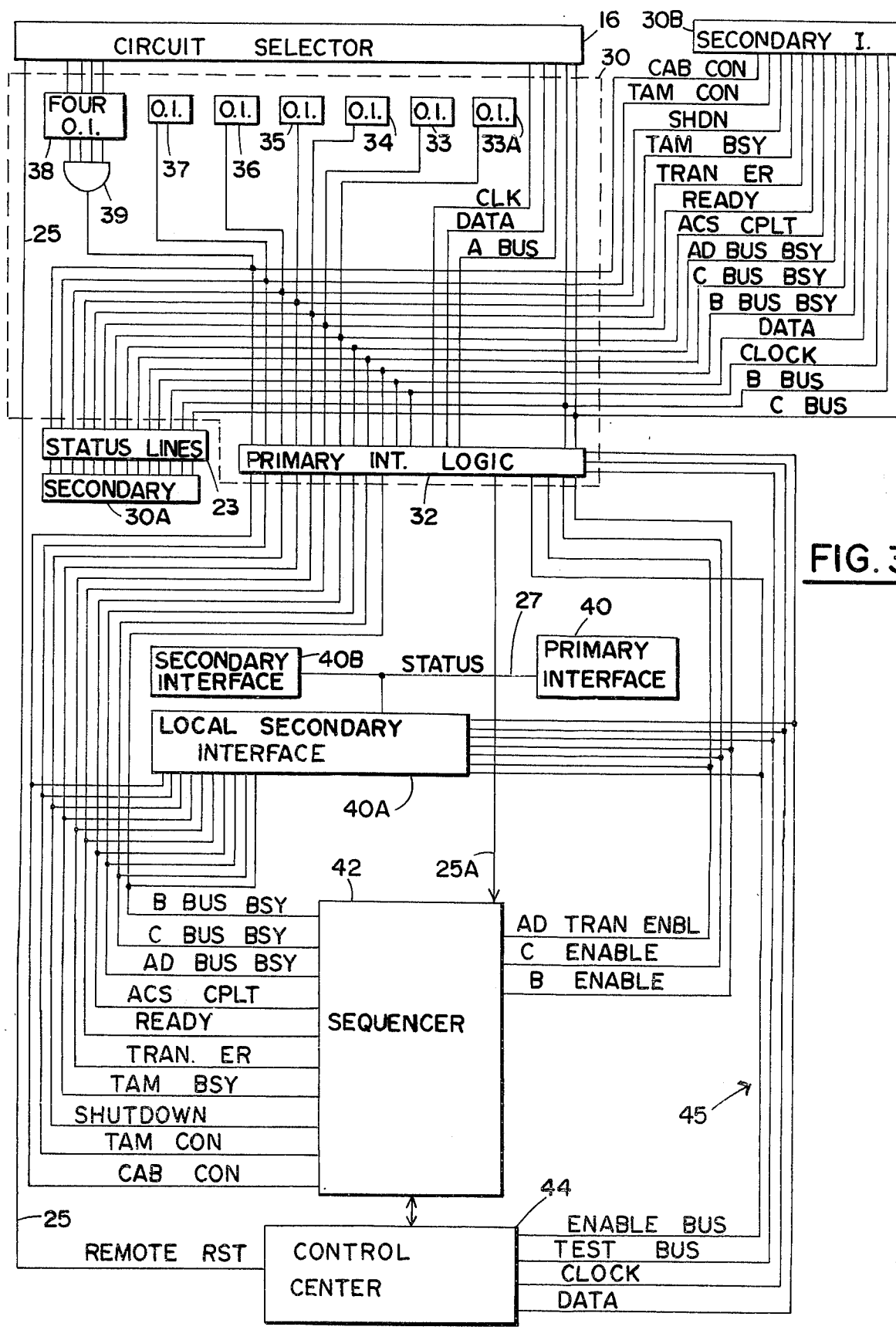
FIG. 3 shows one of those test positions in greater detail.

FIG. 3 shows one of the test positions of FIG. 2.

Figure 4:
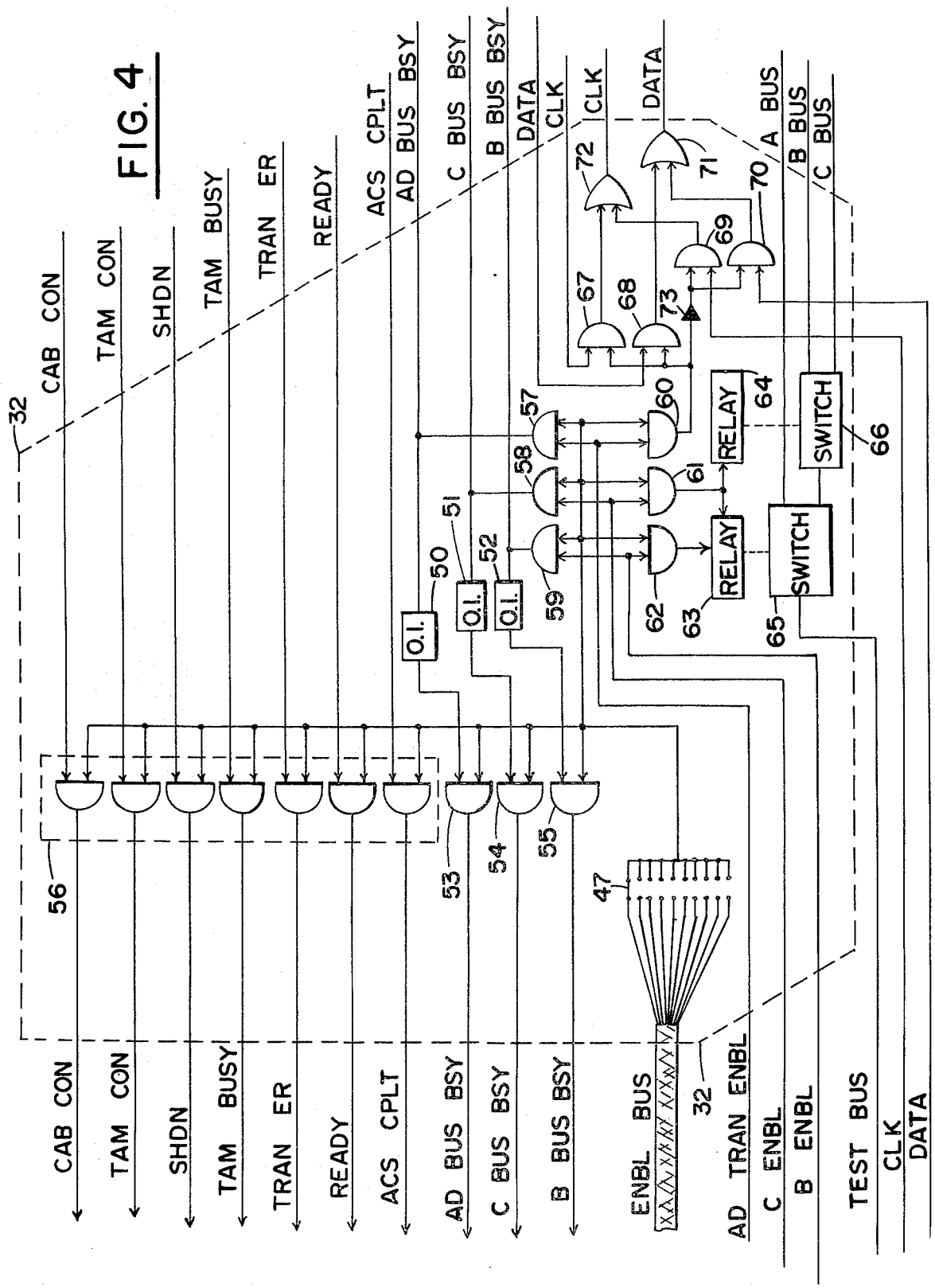
Figure 5:
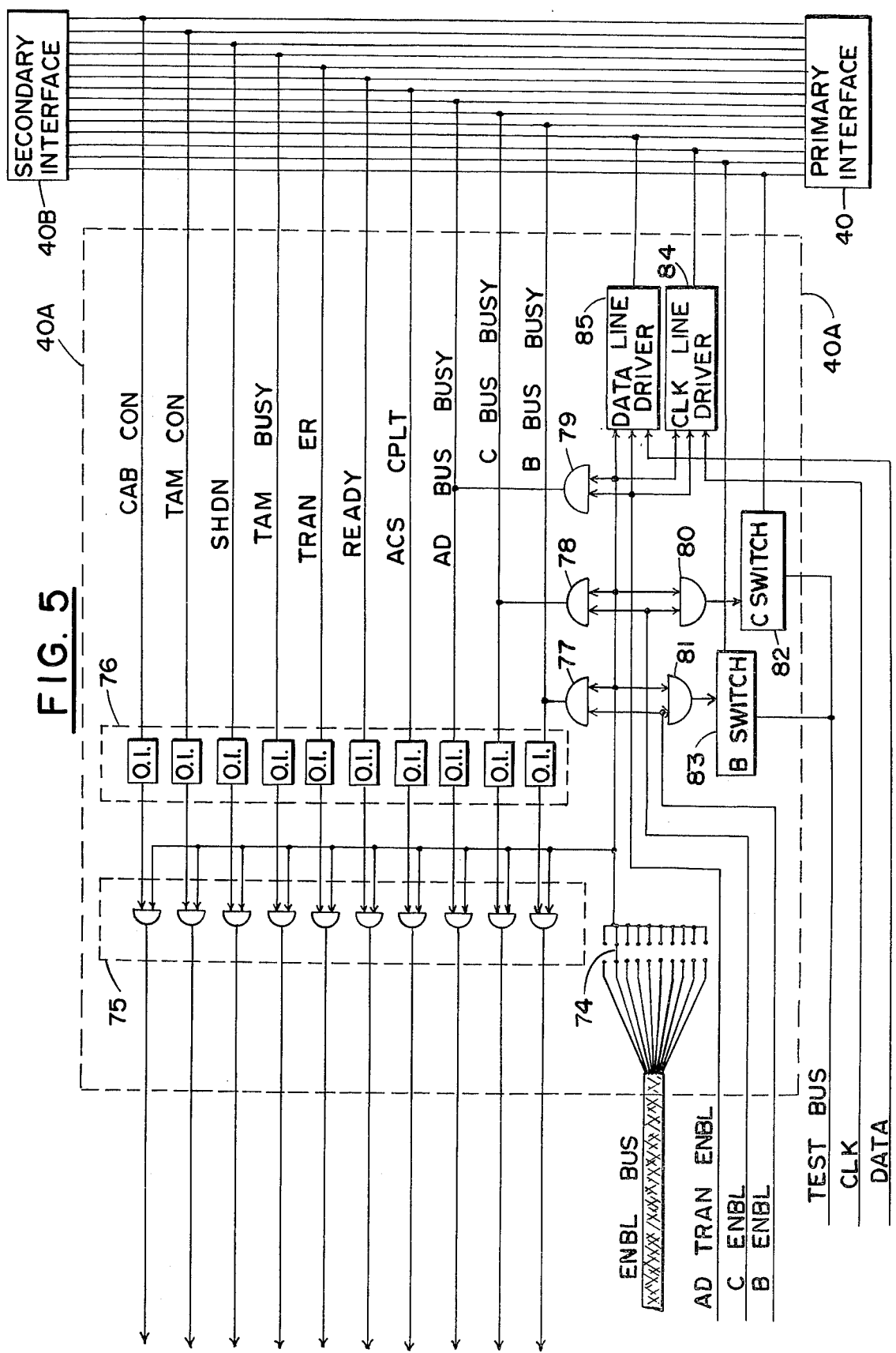

FIGS. 4 and 5 shows respectively the primary and secondary interface circuits of FIG. 3.

Figure 6:
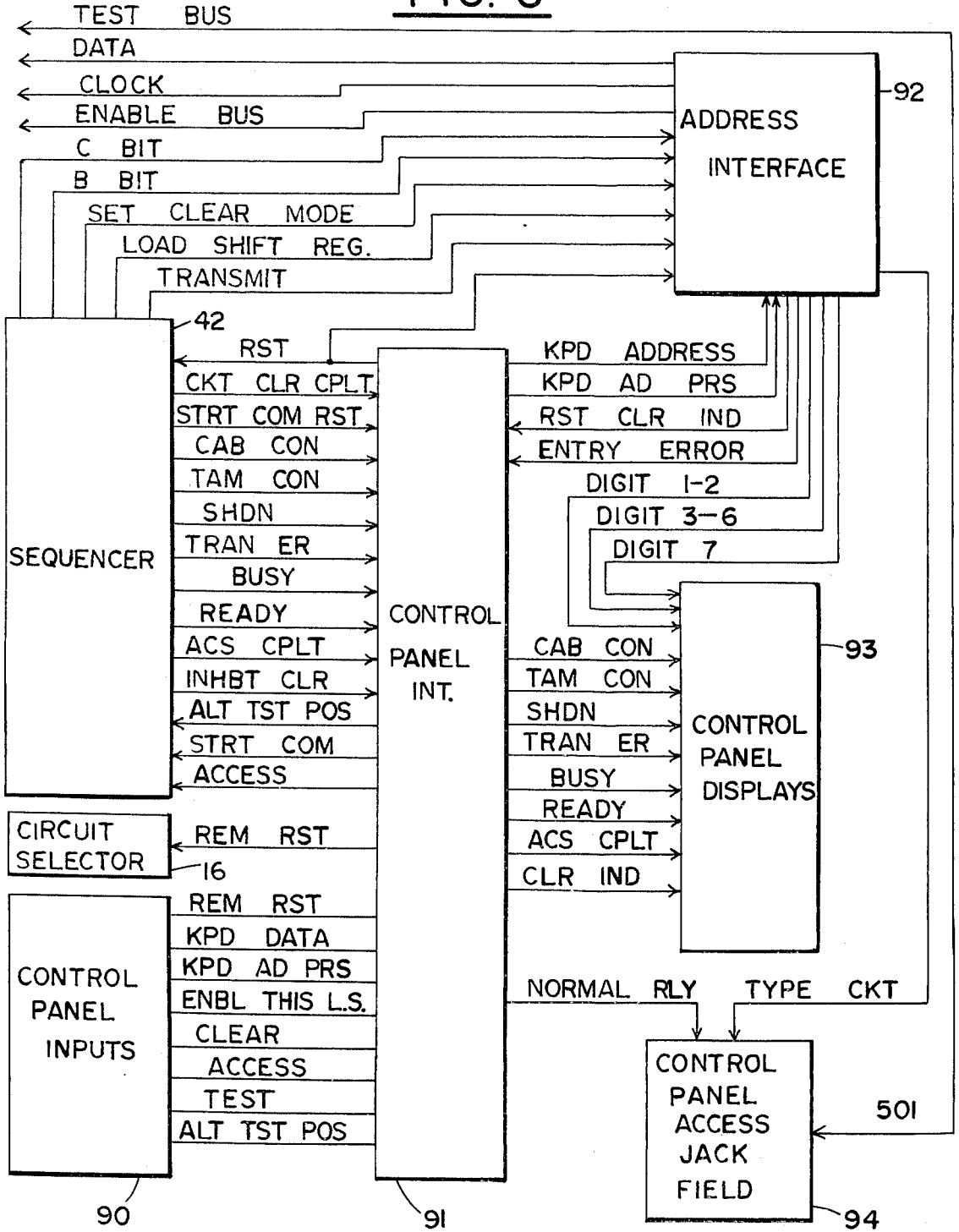

FIG. 6 shows the control center of FIG. 3 in greater detail.

Figure 7:
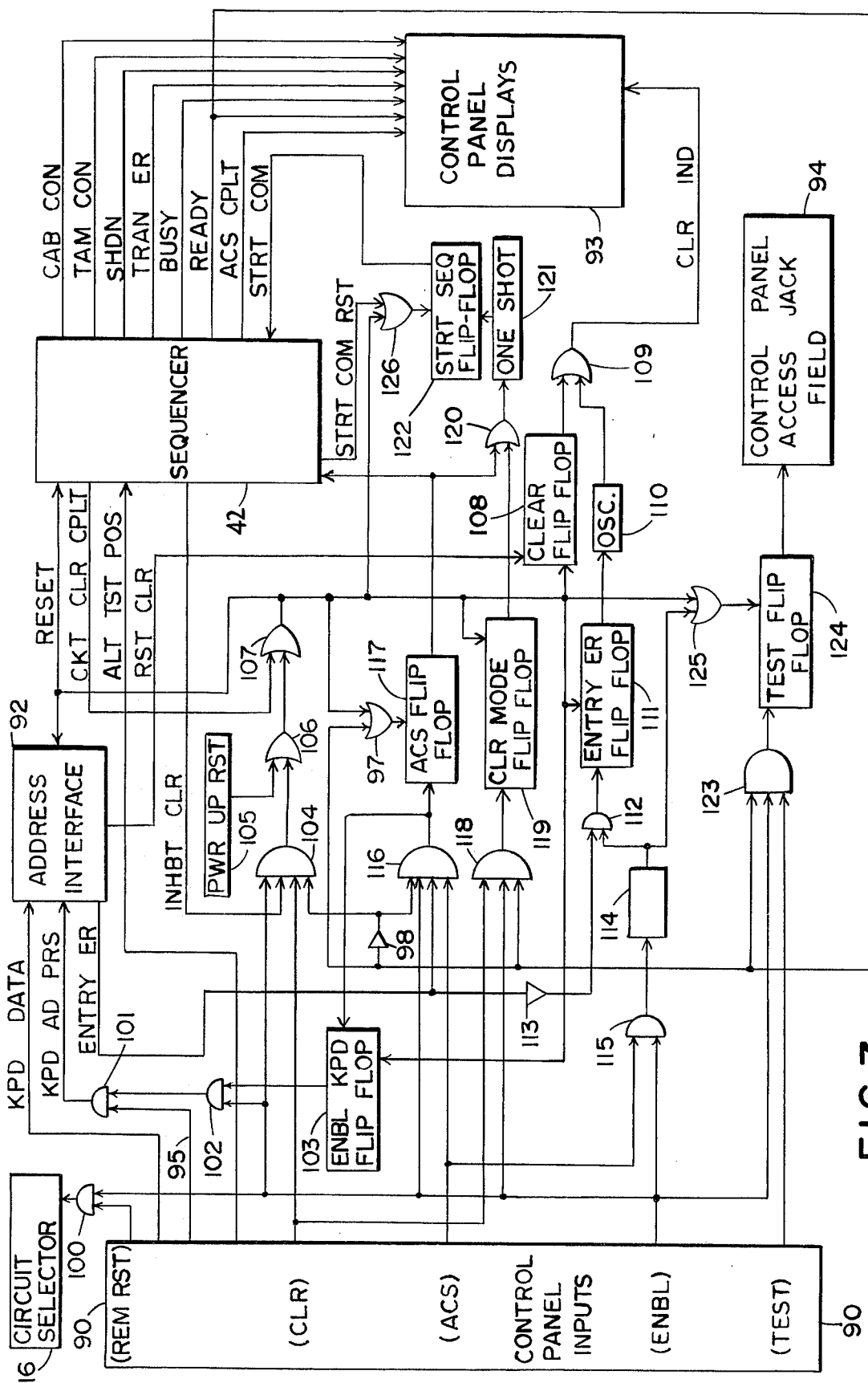

FIG. 7 shows the control panel interface of FIG. 6.

Figure 8:
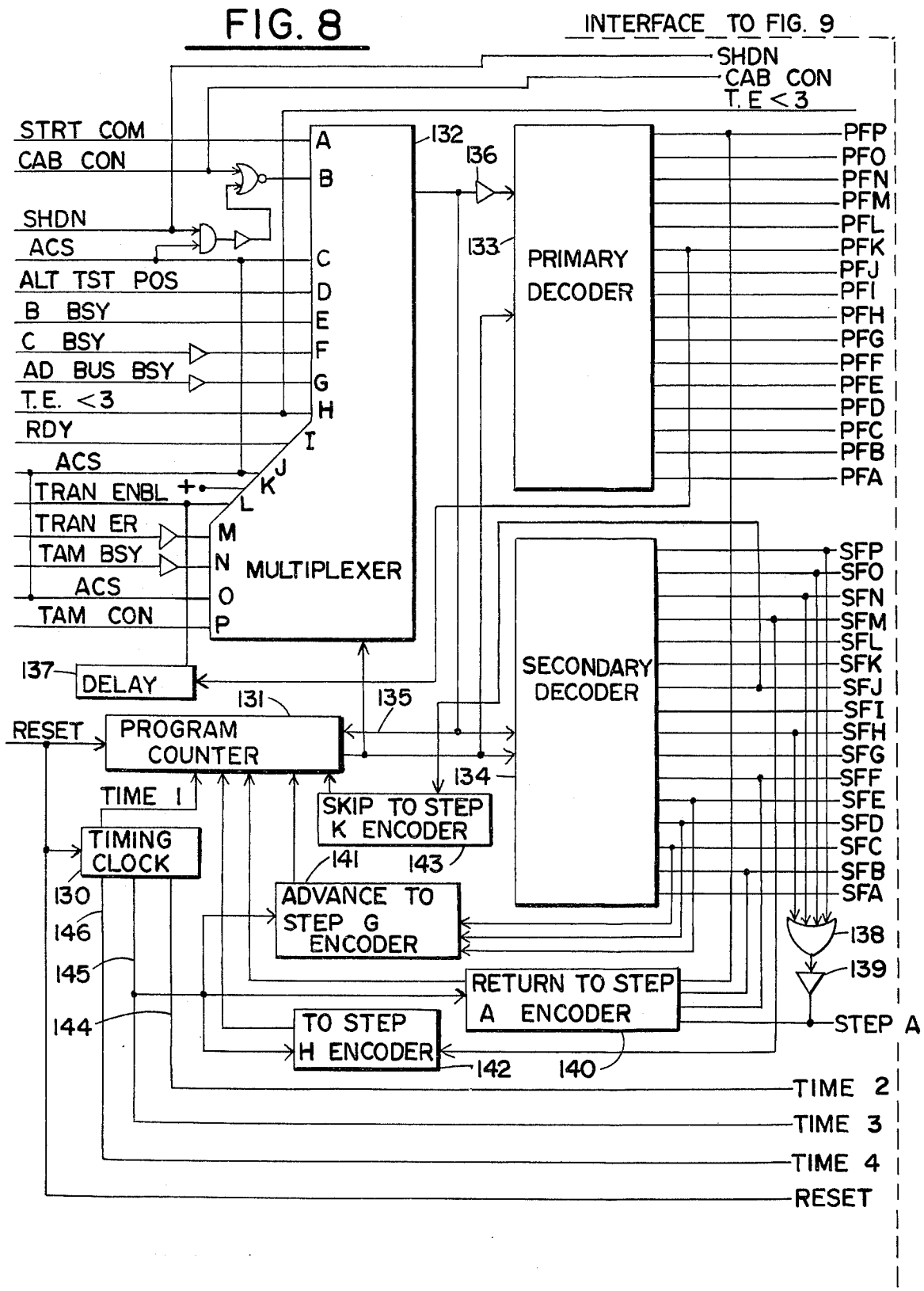
Figure 9:
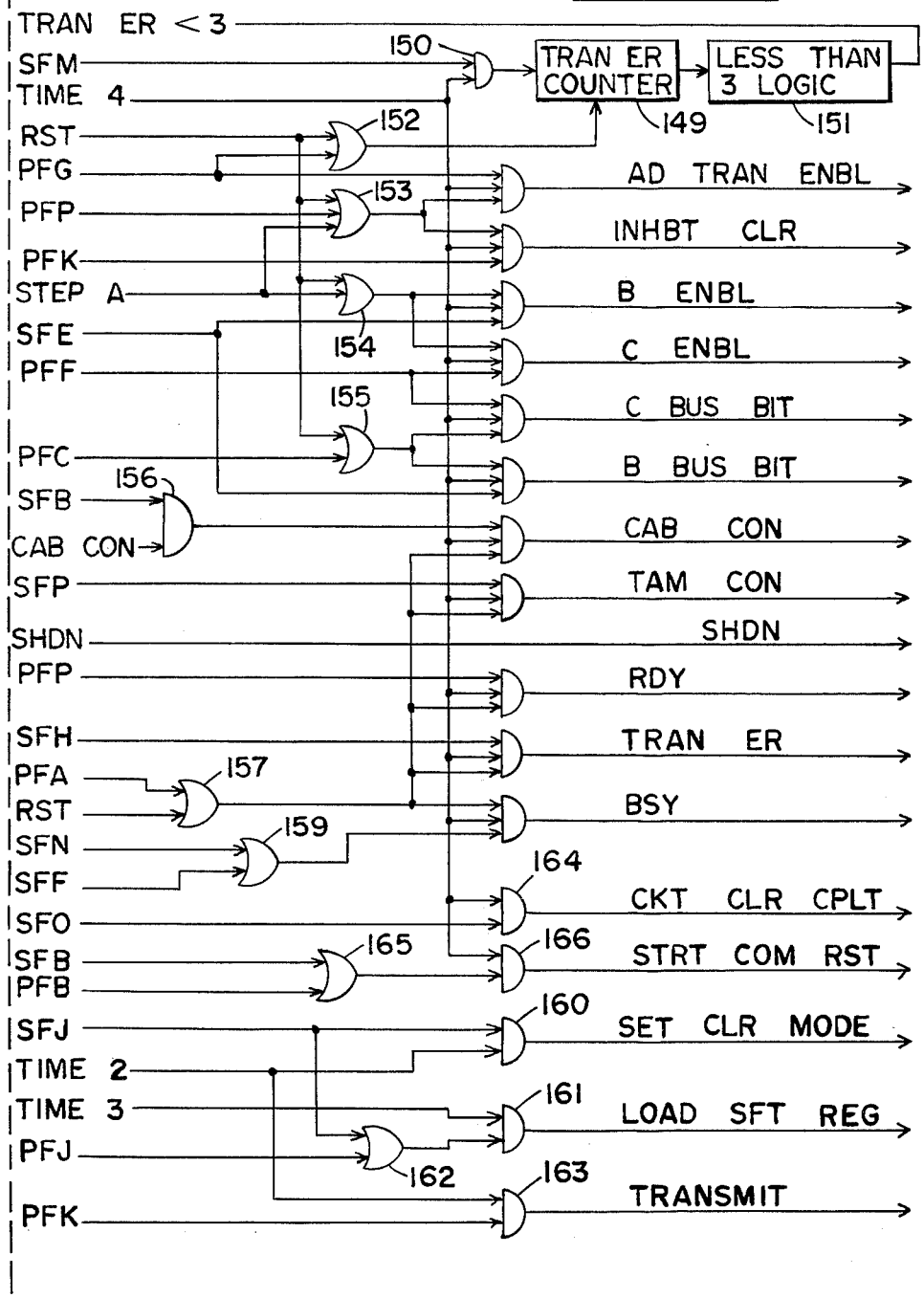

FIGS. 8 and 9 show respectively the left and right halves of the sequencer of FIG. 6.

Figure 10:
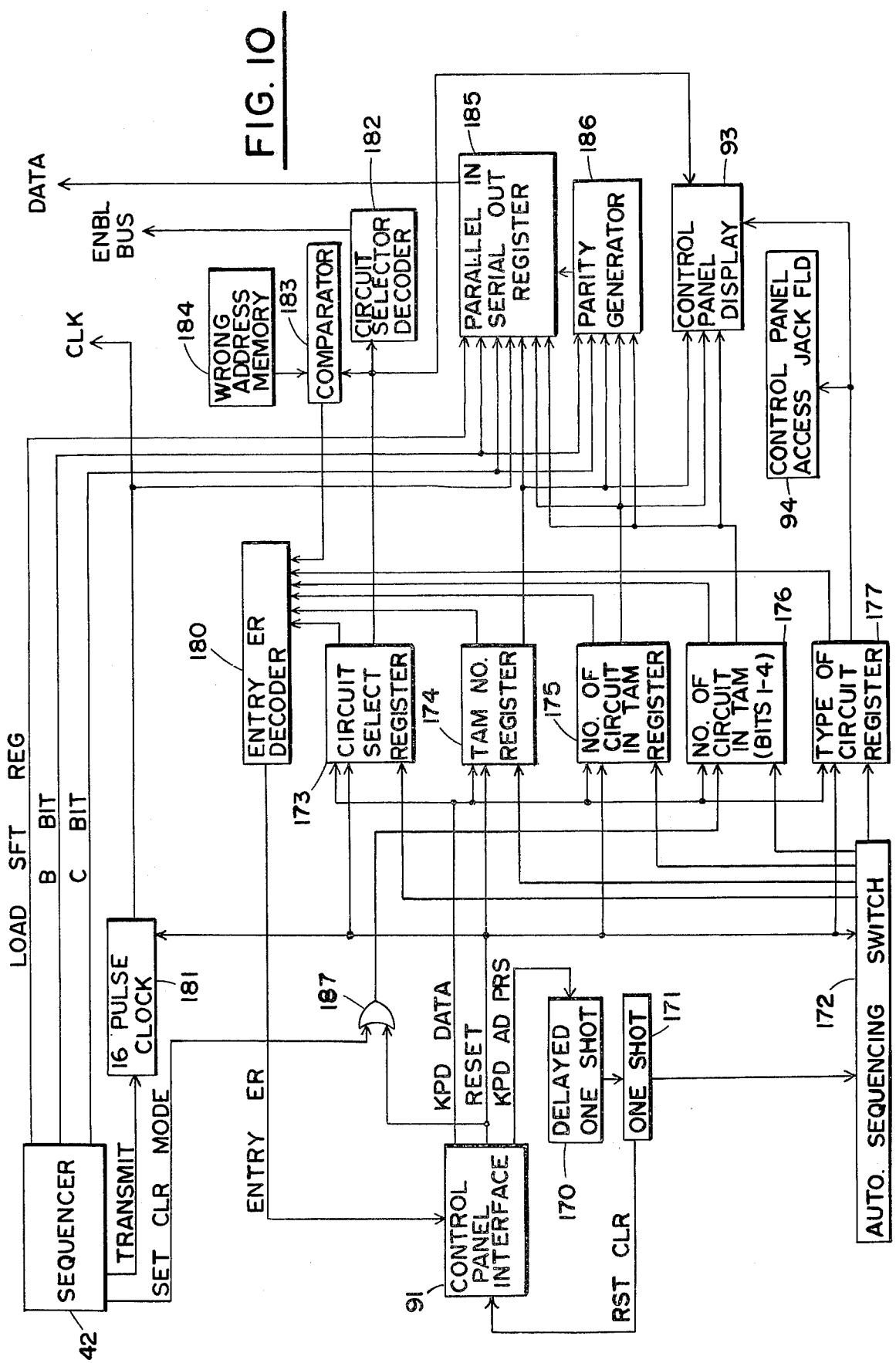

FIG. 10 shows the address interface of FIG. 6 in greater detail.

With FIG. 11 attention is directed away from the test facility and to the access location where the connections are actually made to the communication lines. FIG. 11 shows the circuit selector that performs this function.

FIGS. 12 through 19 are for the most part detailed explanations of various components of FIG. 11 with FIG. 12 showing the validity of clock check and timing generator 202; FIG. 13 showing the timing pulses produced by the circuit selector of FIG. 11; FIG. 14 gives a general description of the data decoder, FIG. 15 a more specific description of the data decoder, FIG. 16 a code table, FIG. 17 the bus select decoder 270, FIG. 18 the TAM busy inhibit and bus storage registers, and FIG. 19 the number of circuit in TAM decoder 264.

Figure 20:
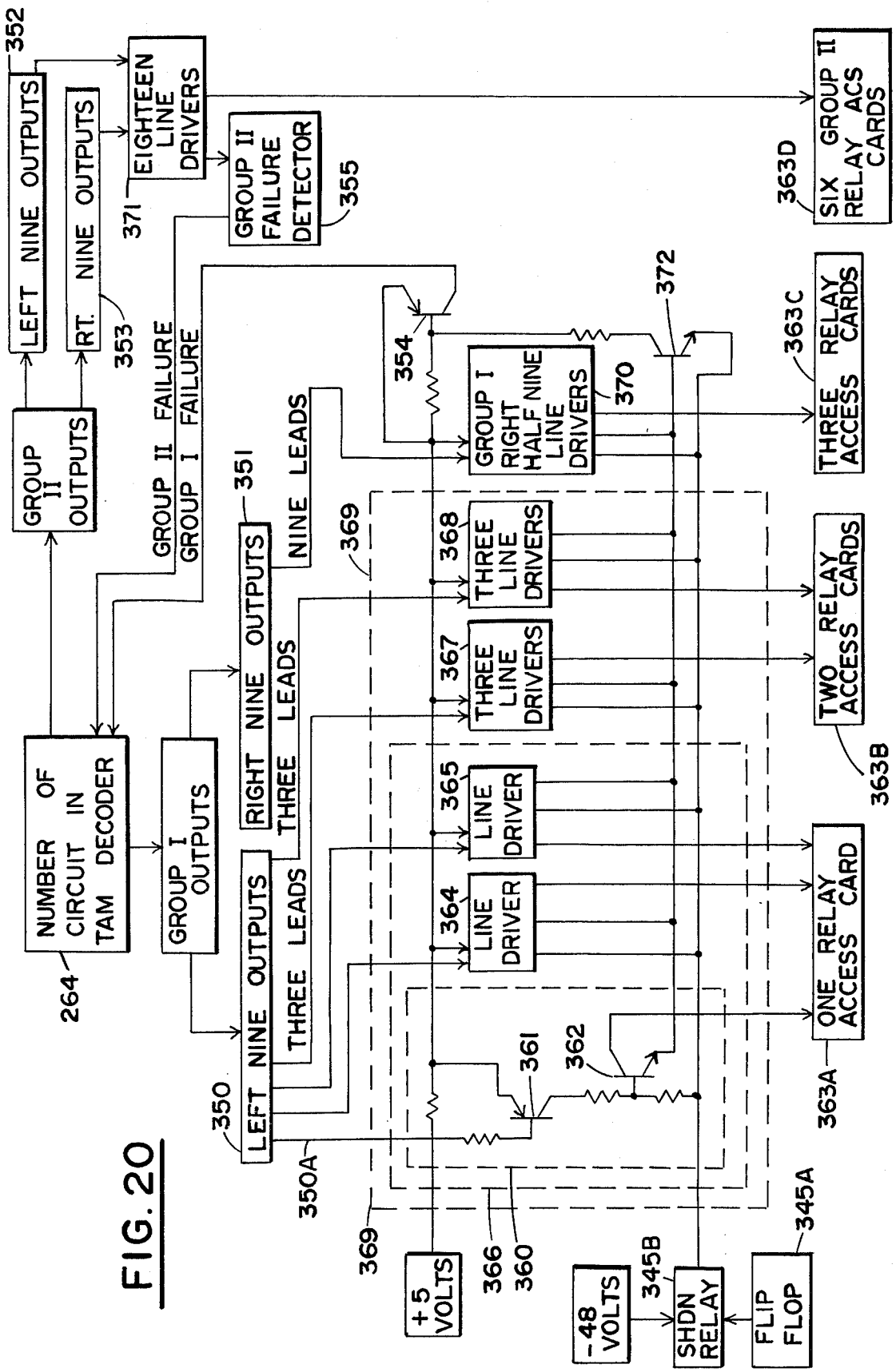

FIG. 20 shows the group I and II line drivers that operate the switches to make connections with the communication lines.

Figure 21:
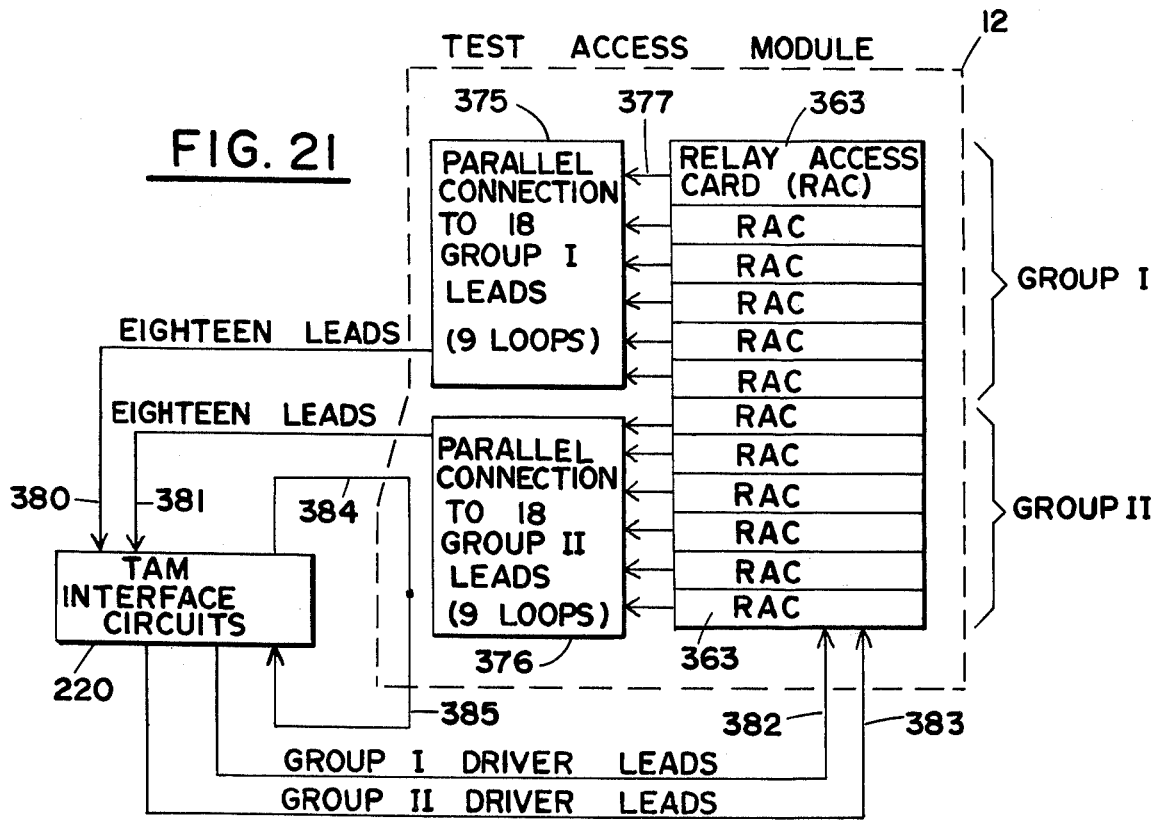

FIG. 21 shows a test access module (TAM) with six group I and six group II relay access cards therein.

Figure 23:
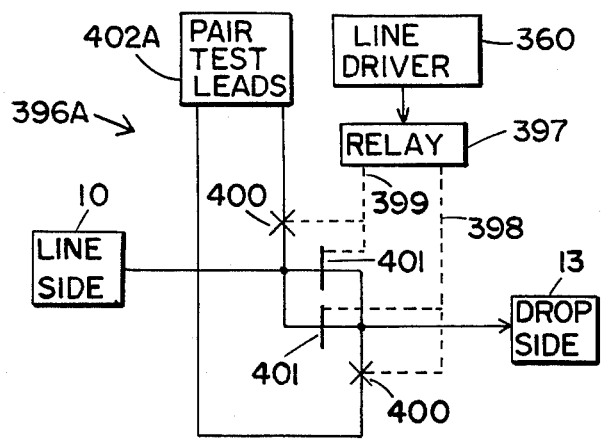

FIG. 22 shows a relay access card in greater detail and FIG. 23 shows one of the switches on the relay access card in greater detail. FIG. 22A shows a test card. FIG. 24 shows a TAM interface circuit.

Figure 25:
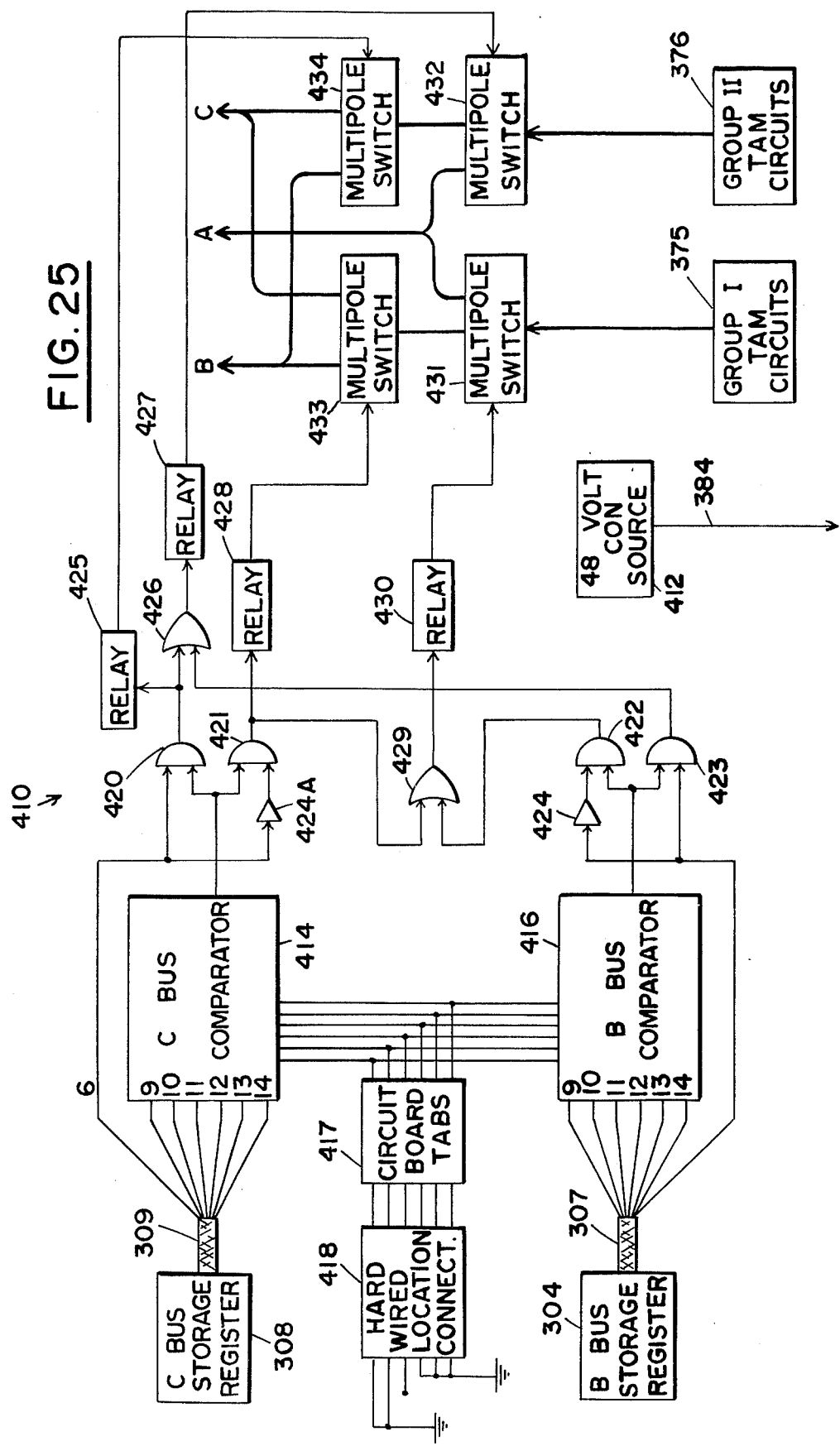

FIG. 25 shows a bus select switching circuit.

FIG. 26 returns to the test position to describe schematically the control panel access jack field shown in the control center schematic of FIG. 6.

FIG. 27 shows another embodiment for selecting an alternate test position.

DESCRIPTION OF THE PREFERRED EMBODIMENT

The overall system as shown in FIG. 1 includes an access circuit selection portion 11 at the top and a remote test center 14 at the bottom. The incoming telephone lines 10 are directed through a group of test access modules (TAMs) where the switches and circuits to loop the communication lines into the test center 14 are located. The telephone lines out are shown schematically by box 13. The particular communication line to be looped is selected by a circuit selector 16 through interface circuits 220. The test access modules 12 and circuit selector 16 operate with suitable power supplies and other auxiliary equipment not shown.

At the remote test center 14 the operator accesses circuits by means of a line selector 19. It will be later seen that line selector 19 also includes a control center, suitable test equipment, power supplies and other auxiliary equipment not shown in FIG. 1. Basically, the operator selects a circuit by requesting the line selector 19 to transmit identifying data out to the circuit selector 16. Circuit selector 16 then loops back the selected communication lines from the test access module through one of three buses A, B, or C to the line selector 19. The line selector 19 automatically reviews status information presented from the circuit selector. This status information includes whether or not the circuit is ready, if there is a transmission error, if a TAM is busy, if the circuit should be shut down, or if there is TAM or cable continuity. The circuits at the test center 14 are examined first in FIG. 2.

Since the present invention contemplates the testing of a very large number of circuits, test center 14 may comprise a plurality of test positions which normally would each have one operator and either one or two line selectors associated therewith. Up to 15 different test positions may be interfaced together in the system described herein. However, more or less could be accomodated with slight modification. For the purpose of description, only three test positions 17, 18 and 20 are described in FIG. 2.

Each test position has a line selector 19 that includes a control center, a sequencer and at least one primary or secondary interface. A test position may include more than one secondary interface and may or may not be associated with a particular circuit selector. If a circuit selector is associated therewith, the test position will have a primary interface. The three test positions of FIG. 2 are chosen to be different types to enhance the explanation of the system.

The middle test position 20 is primarily associated with the communication lines passing through circuit selector 16. The operator working with control center 44 may select a communication line in circuit selector 16 simply by transmitting the code therefore through a sequencer 42. Sequencer 42 works through a primary interface 30 to review incoming status information on a group of lines 41. The status information indicates whether or not all conditions are appropriate for accessing the circuit through circuit selector 16. If the conditions are appropriate sequencer 42 seizes the circuit by means of a group of lines 43 through primary interface 30.

The operator at test position 20 can also access communication lines routed through other circuit selectors such as circuit selector 21. This, however, is done by working through a secondary interface 40A which is connected to a primary interface 40 in test position 17. In this case, sequencer 42 reviews the status information on lines 41 as received through lines 27 and secondary interface 40A and seizes the communication line in circuit selector 21 working through secondary interface 40A and primary interface 40. Likewise, an operator at test position 17 can primarily access communication lines in his circuit selector 21 through his primary interface 40 but if desired may access communication lines in circuit selector 16 by utilizing his secondary interface 30B and the primary interface 30 in test position 20.

A third possibility is shown with test position 18 wherein the operator would actually have no circuit selector and no primary circuits assigned to him. Instead he can work only through someone else's circuit selector. Therefore, test position 18 includes only two secondary interfaces 30A and 40B which allow him to work respectively through primary interface 30 and primary interface 40 to access communication lines in circuit selector 16 and circuit selector 21 respectively. To understand more thoroughly the connections between the primary and secondary interfaces, test position 20 is shown in greater detail in FIG. 3.

LINE SELECTOR OPERATION (One Test Position)

In FIG. 3 it may be seen that the single line 23 of FIG. 2 is, in fact, a group of status lines 23 labeled: cable continuity, TAM continuity, shutdown, TAM busy, transmission error, ready, access complete, address bus busy, C bus busy, B bus busy, data, clock, B bus, and C bus. It can be seen that these status lines connect together primary interface 30 with secondary interfaces 30A and 30B. Similarly line 41 of FIG. 2 is shown as a group of status lines in FIG. 3 including all but the last four of those listed previously. These status lines connect together primary interface 30 with local secondary interface 40A and sequencer 42. The status lines associated with test position 17 are shown only as a single line 27 in FIG. 3 to avoid complexity. However, status lines 27 would be identical in every respect to those shown between secondary interfaces 30A and 30B in FIG. 3 except that they connect together primary interface 40 with secondary interface 40A and secondary interface 40B.

The first seven of status lines 23 derive their information from circuit selector 16. "Cable continuity" simply means that the connecting cables (four in the preferred embodiment) between the test position and the circuit selector 16 are indeed connected. This is accomplished, in the present invention, by generating voltages at the circuit selector 16 and transmitting them through leads in the four cables to a group of four optical isolators 38. If all four optical isolators sense this voltage, a signal is produced by AND gate 39 in primary interface 30 which signal is then placed on the line identified as "cable continuity". Four cables are used to separate physically the pairs of the accessed circuits to minimize crosstalk.

If the TAMs are properly connected in circuit selector 16, as will be described in greater detail later, a signal is directed to an optical isolator 37 and thence to the "TAM continuity" status line. "Shutdown" is a signal indicating an electronic component malfunction in the circuit selector and this is coupled through an optical isolator 36 to the status line. If a particular test access module is busy this too will produce a signal coupled through optical isolator 35 to the appropriate status line. If the data being transmitted out to the circuit selector in order to access the circuit is somehow in error the "transmission error" is detected by the circuit selector and coupled back through optical isolator 34 to the appropriate status line. A "ready" signal is generated at circuit selector 16 and coupled back through optical isolator 33 to the status line. When the access has been made an "access complete" signal returns from circuit selector 16 through optical isolator 33A to the status line. The circuit selector 16 is described in detail later so that the derivation of these status signals will become apparent.

The B and C bus lines are used to loop the communication lines back to the test position and are shared by the primary interface 30 and the secondary interfaces 30A and 30B. The A bus is also for looping communication lines but is reserved exclusively for the local test position. The remaining status lines involve an information exchange between interface circuits and therefore connections do not extend out to the circuit selectors.

Primary interface 30 includes primary interface logic 32. The group of connections identified as a "seize" group 43 in FIG. 2 actually comprise three lines labeled: address transmission enable, C enable, and B enable in FIG. 3. These three connections go both to the primary interface 30 and to the local secondary interface 40A. The group of connections identified as "access" group 45 in FIG. 2 actually comprise four lines labeled: enable bus, test bus, clock, and data in FIG. 3 which are also directed both to the primary interface 30 and to the local secondary interface 40A. A separate line 25 permits the operator at control center 44 to remotely reset circuit selector 16 independent of the interface circuits. Another separate line 25A may be used to tell the sequencer 42 that primary interface 30 has been enabled. This is useful with respect to the embodiment of FIG. 27.

PRIMARY INTERFACE OPERATION

Turning to FIG. 4 primary interface logic 32 is described in detail. If the operator at control center 44 has chosen to work through his own circuit selector 16 he will have generated a signal on the enable bus corresponding to his primary interface 30. For example, this signal may be chosen to be the number one connection shown by strap 47 in FIG. 4. Since primary interface circuit 30 is strapped on the first line, it responds only when a signal is present on the first line of the enable bus. When primary interface 30 is enabled it can be seen that gates 53, 54, 55 and group 56 are all activated to pass the status information through. Thus, the status information from the circuit selector 16 relating to cable continuity, TAM continuity, shutdown, TAM busy, transmission error, ready, and access complete is passed on to sequencer 42 for examination. Also the bus busy status information from the associated secondary interfaces is also passed through to sequencer 42 after suitable isolation by optical isolators 50, 51, and 52. The enable signal also enables gates 57, 58, 59, 60, 61, and 62. If the sequencer determines that the address bus is not busy an address transmission enable signal is presented which activates gates 57 and 60. Gate 57 operates to put an address bus busy signal on the line so that other operators will not attempt to use the line. In addition, gate 60 inhibits normally open gates 67 and 68, thus preventing the passage of data and clock from other operators working through their local secondary interfaces and this primary interface. The signal from gate 60 is inverted by inverter 73 so as to enable gates 69 and 70 and thereby allow the transmission of data and clock from the local control center 44. Thus, the address information can pass out through OR gates 71 and 72 to circuit selector 16 and effect the access of the desired communication line. Normally the communication line is looped back along the A bus, through a normal-through switch 65, and routed down a test bus to the control center 44. If the A bus is busy the operator may, however, choose to use either the B or C bus to bring the circuit back provided they are not busy.

The sequencer determines this by looking at the B and C bus busy lines and if they are available a B enable or C enable signal is generated to activate either gates 59 and 62 or gates 58 and 61. As before, gates 58 and 59 make their respective circuits busy to avoid interruptions by other operators. Gate 62 is activated by the B enable signal and operates a relay 63 which operates switch 65 to receive the B bus from normal-through switch 66. The C enable signal operates gate 61 which turns on both relays 63 and 64 so that both of the multiple pole switches 65 and 66 are operated. In this case the C bus passes through switch 66, switch 65, and down the test bus to the control center.

SECONDARY INTERFACE OPERATION

In FIG. 5 it may be seen that the secondary interface circuit is similar to the primary interface circuit. As an example, the enable bus is, in this case, strapped at the second position shown by the numeral 74. This secondary interface can be activated only by a unique signal present on the number 2 line of the enable bus. The enable signal is again directed to a group of gates 75 which permit the status information coming through a group of optical isolators 76 to be forwarded to the sequencer 42. The enable signal also enables gates 77, 78, 79, 80, and 81. An address transmission enable signal activates gate 79 to make the address bus busy line busy. The signal also operates in conjunction with the basic enable signal to enable data line driver 85 and clock line driver 84. Thenceforth, incoming data and clock from the control center is put onto the data and clock lines which connect to other secondary and primary interfaces. In this case if the secondary interface of FIG. 5 is secondary interface 40A, the status lines go to primary interface 40. Accordingly, the clock and data from line drivers 84 and 85 goes to primary interface 40, in the manner described with respect to FIG. 4, and out to circuit selector 21 to access the communication lines associated therewith.

When an operator is working through another operator's primary interface he does not have access to the other operator's A bus. Instead the information is available only through the auxiliary B and C buses. In this way each operator is guaranteed access to his own circuit selector through his own A bus. In FIG. 5 it may be seen that a B enable signal operates a gate 77 so as to make the B bus busy line busy and a gate 81 so as to operate multiple pole switch 83 and allow the B bus to pass through to the test bus. Likewise, the C enable signal operates a gate 78 to make the C bus busy line busy and a gate 80 to operate multiple pole switch 82 and allow the C bus through to the test bus and thence on to the control center.

CONTROL CENTER OPERATION

FIG. 6 shows control center 44 in greater detail. Control center 44 basically includes the control panel inputs 90, a control panel interface 91, the control panel displays 93, an address interface 92, and a control panel access jack field 94. Also incidentally shown in FIG. 6 is the sequencer 42 and circuit selector 16. Basically all of the connections are labeled in FIG. 6 according to the table of abbreviations. Reference should be made back to FIG. 6 when studying the individual elements in FIGS. 7 through 10.

Control panel inputs 90 include those switches and buttons which the operator uses in order to generate the signals labeled in FIG. 6 as: remote reset, keypad data, keypad address present, enable this line selector, clear, access, test, and alternate test position. Since these switches are well known to those skilled in the art they are not described herein.

Control panel displays 93 represent the lights and LED displays which indicate to the operator the various numbers he has entered and the status conditions of which he should be aware. These are also well known and not described herein.

CONTROL PANEL INTERFACE OPERATION

In FIG. 7 the control panel interface 91 is shown in detail along with the control panel inputs 90, the control panel displays 93, the sequencer 42, address interface 92, circuit selector 16, and control panel access jack field 94. If the operator wishes for some reason to reset the circuit selector, due to a malfunction for example, he can do that directly from his control panel by activating the enable switch and the remote reset switch. When both of these inputs are presented to a gate 100, a remote reset signal is sent out to circuit selector 16. Normally this is not necessary since the conventional operation of the circuit clears circuit selector 16 in the normal course of events.

To begin operation the operator enables the circuit. This could happen automatically in response to turning the unit on or, since it is possible for the operator to have two or more line selectors, it could be done by the switch he uses to select the line selector. In any case, in FIG. 7 the enable signal is presented to gates 100, 102, 104, 116, 118, 115, and 123. The operator now selects the circuit he would like simply by entering a seven digit number on a conventional telephone type keypad. This operation addresses and eight-wire communication line which may include a pair of four-wire circuits or four two-wire circuits or a six-wire and a two-wire circuit as desired. The keypad is of the type that when data is entered it also generates a separate signal on line 95 identified herein as a keypad address present signal (KPAP). The keypad data itself is conveyed by connection 96 through the control panel interface to the address interface 92. The address interface 92 operates on this data only if it receives a KPAP from gate 101 which is enabled by line 95 and a signal from gate 102. At this time clear flip-flop 108 is reset by a signal from address interface 92. Gate 102 operates in response to the enable signal and a signal from enable keypad flip-flop 103. Flip-flop 103 is connected so as to inhibit gate 102 when there is an output from gate 116 indicative that the circuit is being accessed. Thus, once the operator decides to access the selected circuit he is prevented from entering any further keypad data.

Before the operator can address a different trunk through the same line selector he must first press the clear button which operates gates 104 and 118. Gate 104 operates through an OR gate 106 and an OR gate 107 to produce a reset signal which goes to the sequencer 42, the address interface 92, and many other elements in the control panel interface 91. This reset signal is looped back to flip-flop 103 to reset the flip-flop and permit the further entry of keypad data.

The OR gates 106 and 107 make it possible to also reset the circuit from sequencer 42 (shown as circuit clear complete) and from a power up reset circuit 105 which operates when the system is initially turned on. It is not possible to operate gate 104 and manually clear the system if there is an inhibit clear signal from the sequencer or a ready signal from the sequencer through inverter 98.

Having identified the desired circuit the operator can now access the circuit by pressing the access button and operating the gate 116 which has been enabled previously. It can be seen in FIG. 7 that gate 116 is inhibited by the ready signal from inverter 98 and additionally enabled by the address interface generated signal that there has been no entry error. If all of these conditions are met, gate 116 operates flip-flop 103 to prevent the entry of further keypad data and also operates access flip-flop 117. (It should be noted that access flip-flop 117 is reset through an OR gate 97 either by the conventional reset signal or by a ready signal from the sequencer.) Flip-flop 117 produces a signal which is directed to the sequencer to indicate that the system is in the access mode and through an OR gate 120 to a one-shot 121. One-shot 121 activates a start sequencer flip-flop 122 which sends a "start command" signal to the sequencer to indicate that it should now begin to review the status information and transmit out the data and clock information if everything is suitable. When the sequencer has completed this operation a "start command reset" signal is redirected down through an OR gate 126 to reset flip-flop 122. OR gate 126 also permits flip-flop 122 to be reset by the conventional reset signal.

Sequencer 42 is also used during the clearing operation since it is desired that the various circuits be cleared out in the same sequence in which they are accessed. Accordingly, when the operator presses the clear button he activates gate 118. Gate 118 is enabled by the ready line and thus operates only after the sequencer has indicated that the circuit is ready. If these conditions prevail, gate 118 operates clear mode flip-flop 119 which operates again through OR gate 120 and one-shot 121 to set the start sequencer flip-flop 122. Again, after the clear cycle is completed a "start command reset" signal returns from the sequencer 42 through OR gate 126 to reset flip-flop 122.

When the circuit has been cleared gate 104 produces a reset signal which operates clear flip-flop 108 which in turn operates a clear indicator light in the control panel display 93 through an OR gate 109.

It should be noted that when the operator presses the access button he also operates gate 115 which operates a one-shot 114 so as to reset test flip-flop 124 through OR gate 125. Flip-flop 124 operates a normal relay in the control panel access jack field 94 to insure against having the accessed circuit arrive at an open connection in the jack field. Once having accessed the circuit the operator can audibly monitor the circuit to make sure it is not in use prior to performing any tests on it. If the circuit is not is use he operates the test switch which activates gate 123 (provided both enable and ready inputs are being received) which causes test flip-flop 124 to switch out the normal relay. This is described in greater detail with respect to FIG. 26.

One-shot 114 also activates a gate 112 if gate 112 is receiving an entry error signal through inverter 113. Gate 112 operates entry error flip-flop 111 which turns on an oscillator 110 so as to flash the clear light through OR gate 109. The flashing clear light on the control panel display 93 is an indication to the operator that he should clear the system because he has made an error in entering data.

All of the operation so far has assumed that the operator is working with his own circuit selector. If, in fact, the operator wishes to access through another operator's circuit selector he first presses an alternate test position button and this signal is routed through the control panel interface to the sequencer 42 as shown in FIG. 7.

It should also be noted that the operator has on his control panel a series of seven lights to identify status conditions that may arise. These are activated through the control panel interface 91 from sequencer 42 by the lines labeled cable continuity, TAM continuity, shutdown, transmission error, busy, ready, and access complete. The operator also has a lamp test button on his control panel which operates all of the lamps to ensure that they are in working condition but this is not shown in the drawings as it is well known to those skilled in the art.

SEQUENCER OPERATION

The sequencer is shown in FIGS. 8 and 9 with the left half of the sequencer shown in FIG. 8 interfaced by a dashed line to the right half shown in FIG. 9. The connections across the dashed line between FIGS. 8 and 9 are identified with a three letter code in a majority of the cases. These codes may be read as follows: PFA means primary function A; PFB means primary function B; and so on through PFP which means primary function P; SFA means secondary function A and so on through SFP which means secondary function P. The primary or secondary designation relates to whether the outputs are produced by the primary decoder 133 or the secondary decoder 134. The A through P designation indicates a sequence of steps in time progressing from A to P as determined by multiplexer 132. The review of the status information and the processing of information takes place in the time it takes for the sequencer to cycle from step A through step P. Sequencer 42 is generically known to those skilled in the art as a hard wired controller and could also be implemented with a microprocessor. However, because of important specialized functions in the present invention it is deemed useful to know exactly how the sequencer operates and therefor the entire sequencer is schematically displayed in FIGS. 8 and 9.

The basic timing comes from a clock 130 which produces four series of time pulses which are mutually exclusive and not overlapping. Time 1 series of pulses is used to drive a program counter 131 while time 2, 3, and 4 are directed on lines 144, 145, and 146 to the right half of the sequencer in FIG. 9. The differing times ensure a separation of commands generated by the sequencer. Program counter 131 is connected to multiplexer 132, primary decoder 133, and secondary decoder 134 so as to drive all three in unison. As each step is taken the multiplexer examines its inputs to see if a signal is present and if it is there is no output. Since the multiplexer output is inverted by an inverter 136 the primary decoder 133 is caused to produce an output for each step in which an output from the multiplexer is not present. The secondary decoder 130 receives the multiplexer signal direct, however, and therefore produces an output for each step in which an output from the multiplexer is present. The program counter 131 is itself inhibited on line 135 by a signal from the multiplexer so that is no input is presented to the multiplexer the program counter is halted until an input is present. Thus, if no start command is present on input A to multiplexer 132 a signal is continually produced by multiplexer 132 which inhibits program counter 131 from advancing past step A.

The start command arrives in the sequencer from flip-flop 122 in the control panel interface 91. This removes the inhibit signal on line 135 so that the multiplexer and both decoders begin to advance in unison through the steps. At step B multiplexer 132 looks to see if it has either a cable continuity problem or a shutdown problem present. An AND gate and inverter as shown in FIG. 8 are used to monitor the shutdown signal for the sequencer only during the access mode. If either of these conditions is present, the input at step B is missing and multiplexer 132 produces an output signal causing secondary decoder 134 to produce an output signal on SFB (secondary function B). This output is directed to a return to step A encoder 140 which forcibly encodes program counter 131 back to step A and terminates the cycle. In FIG. 9 it can be seen that the SFB signal is also transmitted through and OR gate 165 to operate gate 166 (at time 4) so as to generate a start command reset signal which returns to the control panel interface 91 to reset flip-flop 122 as described earlier. In FIG. 9 almost all of the output gates are connected to the time 4 line so as to be enabled only after all of the inputs have been presented to them. Also in FIG. 9 the SFB signal is presented to gate 156. If there is a cable continuity problem gate 156 is activated, thus, enabling cable continuity gate at time 4 so as to direct a signal through the control panel interface 91 to the control panel display 93 and turn on the light indicating to the operator that there is a cable continuity problem. If there is a shutdown problem, the shutdown signal is coupled through the control panel interface to the control panel display to operate a signal light therein.

Returning to the left half of the sequencer in FIG. 8, multiplexer 132, if still advancing, examines input C which is the access mode line. If no signal is present on the access mode line it means that this cycle is a clear mode cycle and the output pulse from multiplexer 132 produces an SFC output from secondary decoder 134 on step C. SFC is coupled back to encoder 141 which forcibly advances the program counter 131 to step G so as to skip the intermediate steps. If, however, an access mode signal is present at the mutliplexer primary decoder 133 is activated producing an output on PFC which is used in FIG. 9 to reset the B and C bus gates. The output from the B and C bus gates goes to the address interface shown in FIG. 10 for transmission out to the circuit selector to inform the circuit selector if the B or C bus is to be used. (This has not yet been decided). Again in FIG. 8 multiplexer 132 moves on to step D and checks to see if an alternate test position is being chosen. If not, secondary decoder 134 again causes encoder 141 to advance program counter 131 to step G. If an alternate position is chosen it is necessary to check the condition of the B bus and C bus since these must be used to work through an alternate position. At step E multiplexer 132 checks to see if B bus is busy, if it is not, a signal is produced by multiplexer 132 which causes secondary decoder 134 to produce an output SFE. This is coupled to encoder 141 to advance the program counter 131 to step G. SFE also enables the B enable gate in FIG. 9. At the same time, SFE is used to enable the B bus gate to inform the circuit selector that B bus is being used. But, if B bus is busy no outputs are generated and the multiplexer moves on to step F.

At step F multiplexer 132 checks the inverted C bus busy signal. If C is not busy there is a signal present and therefore no output signal from multiplexer 132. Accordingly, there is an output from primary decoder 133 and this PFF signal is used to enable the C enable gate in FIG. 9 whose output goes to the primary interface (see FIG. 3). PFF also enables the C bus gate whose output goes through the address interface to inform the circuit selector that C bus is being used. If, however, C is busy, there are no remaining buses which can be utilized. The corresponding lack of input signal at step F causes an output signal from multiplexer 132 so that secondary decoder 134 produces an SFF signal. SFF is coupled back to encoder 140 so as to cause the program counter 131 to return to step A and halt the cycle. SFF is also directed through OR gate 159 in the right half of the sequencer to enable the busy gate which is directed through the control panel interface 91 to the control panel display 93 to operate a light and inform the operator that the system is busy.

A similar procedure is carried out for the address bus busy at step G. If the address bus is not busy there is, because of the inverter, an input to step G and multiplexer 132 produces no output. Primary decoder 133, thus, produces a PFG signal which is used in the right half of the sequencer to enable the address transmission enable gate which goes to the primary and secondary interfaces as shown in FIG. 3. The PFG signal is also used in the right half of the sequencer to reset the transmission error counter 149 through gate 152. The transmission error counter is now ready to start counting the number of times that the address is sent out to the circuit selector as described hereinafter.

At step H the multiplexer looks to see if the transmission error is less than three (which it always would be the first time around) and if so there is a signal present at H and no output from multiplexer 132.

At step I the multiplexer looks to see if the circuit is ready and if not, the inhibit signal on line 135 holds the counter until ready is received.

At step J the multiplexer again examines to see if this is the access mode and if so there is no output so that primary decoder 132 produces a PFJ signal. The PFJ signal passes through an OR gate 162 to enable gate 161, at time 3, so as to load the shfit register with the 16 bits of address and command information to be sent to the circuit selector. On the other hand, if there is no access signal present at step J then it must be a clear mode cycle and a signal is produced by secondary decoder 134 on lead SFJ. SFJ is coupled back through encoder 143 to cause program counter 131 to advance to step K. SFJ is also used in the right half of the sequencer to enable a gate 160, at time 2, so as to send out a clear mode signal which signal is directed to the address interface 92 described in FIG. 10. SFJ also couples through OR gate 162 to operate gate 161, at time 3, and again send a signal to load the shift register. This time the data is loaded to identify the communication line that is to be cleared.

At step K there is always a positive voltage presented and therefore no output from multiplexer 132. Accordingly, primary decoder 133 always has a PFK output at this step which is coupled back through a delay circuit 137 and presented, after a delay, to input L on the multiplexer. Thus, when multiplexer 132 arrives at step L there is no signal present for a while and the output inhibits program counter 131, preventing further advancement until delay 137 completes a predetermined time delay. This delay ensures an adequate time during which the data can be transmitted out to the circuit selector. The PFK signal is also used in FIG. 9, first to enable the inhibit clear gate which sends a signal back to control panel interface 91 as described in FIG. 7. Secondly, the PFK signal operates a gate 163, at time 2, to signal the address interface 92 to transmit the data. This transmit signal starts a clock 181 in address interface 92 which is described with respect to FIG. 10.

At the completion of the delay the inhibit is removed from program counter 131 and the multiplexer advances to step M where it checks for a transmission error. If there is a transmission error, secondary decoder 134 produces an output SFM which is coupled back to encoder 142 which forces the program counter to return to step H and try once again to cycle through and transmit the data. (It should be noted that encoders 140, 141, and 142 are all caused to operate at time 3 by a connection to line 145.) The SFm signal is used in the right half of the sequencer to operate a gate 150 at time 4 so as to clock transmission error counter 149 ahead one count. At this point, however, the number of transmission errors are still less than three and the multiplexer which has now returned to step H advances once again. Continued transmission errors will repeat the cycle until finally the less than three logic 151 is activated. This changes the condition at the step H input of the multiplexer. Now secondary decoder 134 produces an output on SFH which goes through an OR gate 138 and an inverter 139 to activate step A line which in turn operates encoder 140 and returns the whole system to step A. The step A signal is used in the right half of the sequencer through OR gates 153 and 154 to reset the address transmission enable gate, the inhibit clear gate, and the B and C enable gates. In addition, the SFH signal is used in FIG. 9 to enable the transmission error gate which is directed back through the control panel interface to operate a light on the control panel display and indicate to the operator that he has a transmission error.

At step N the multiplexer examines to see if the TAM is busy and if it is an SFN signal is produced which goes through OR gate 138 and inverter 139 to return the system to step A. In FIG. 9 SFN goes through OR gate 159 to operate the busy gate and inform the operator of a busy condition.

At step O the multiplexer examines again to see if this is an access mode situation and if it is not (indicating a clear mode), an SFO signal is produced which returns the system to step A and operates a gate 164, at time 4, producing a circuit clear complete signal which is used in the control panel interface to produce a reset signal and clear out the system automatically.

At step P the TAM continuity is examined and if it is faulty an SFP signal is produced which returns the system to step A again. SFP also enables a TAM continuity gate at time 4 which informs the operator with a light on display 93.

ADDRESS INTERFACE OPERATION

In FIG. 10 the address interface 92 is described in detail. Address interface 92 is connected to the sequencer 42, the control panel interface 91, the control panel display 93, and the control panel access jack field 94. As the operator enters the keypad data with the control panel inputs the data comes through the control panel interface 91 and is presented simultaneously to five shift registers 173, 174, 175, 176, and 177. Which of these shift registers stores the data is determined by an automatic sequencing switch 172 which proceeds automatically to put the data in the proper register. The keypad address present signal from the control panel interface 91 operates a delayed one-shot 170 which in turn operates another one-shot 171. One-shot 171 increments automatic sequencing switch 172. Also one-shot 171 generates the reset clear light signal which is sent back to the control panel interface to be used therein as described earlier. The reset signal from the control panel interface 91 is used to reset all of the shift registers 173–177 to a starting condition. Additionally, register 176, which handles bits 1 through 4 of the "number of the circuit in the TAM", can also be reset by the sequencer through OR gate 187 with the set clear mode signal. Since bits 1 through 4 are used by the circuit selector to determine when a clear mode condition is present (that is: all zeros on bits 1 through 4 means clear mode), when sequencer 42 resets register 176, it in effect sends out a clear mode signal to the circuit selector. The coding arrangement to identify desired communication lines never incorporates a code with all zeros in it so the clear mode signal is never transmitted except when register 176 is reset by sequencer 42.

The first two numbers the operator enters represent the number of the circuit selector he is seeking to access. Automatic sequencing switch 172 passes the keypad data for these two numbers to circuit selector register 173. Next he enters the number of the TAM containing his circuit and this is automatically fed into register 174. Then the operator enters the number of the circuit in the TAM and switch 172 directs this information into registers 175 and 176 with the parallel connections being chosen such that bits 1 through 4 go into register 176 while the remaining bits, namely bits 5 and 6, go into register 175. The operator then can enter another digit indicating the type of circuit (2, 4, 6, or 8 wire) that he desires and this is entered into register 177. This sequential type of entry is well known to those skilled in the art and is therefore not further described herein.

All of the circuit registers are wired in such a way as to produce output signals in response to the entry of numbers which they are not intended to store. All of these "wrong entries" are presented to an entry error decoder 180 which produces the entry error signal directed back to the control panel interface 91. In a similar manner, the entry error decoder 180 receives an entry error signal from comparator 183 which compares the address from register 173 with a collection of wrong addresses stored in a wrong address memory 184. If a match is made an entry error is signaled back to interface 91.

Circuit selector decoder 182 receives data from register 173 and decodes it and sends a signal out on the appropriate lead of the enable bus which goes to all of the secondary and primary interfaces as shown in FIGS. 3 and 6. Now that a suitable interface circuit has been enabled, it is possible to send out the circuit indentifying data to the appropriate circuit selector. The operator accomplishes this by operating the access switch.

As described before, the access switch operates through the control panel interface 91 to start the sequencer. As described with respect to the sequencer operation, the status information from the selected circuit selector is reviewed and if everything is correct a transmit signal is presented by sequencer 42 to clock 181 which produces a series of exactly 16 pulses. These clock pulses are directed out through whichever primary or secondary interface circuit has been enabled to the appropriate circuit selector. The clock is also used to operate parallel-in-serial-out register 185. Register 185 has previously been loaded with data from registers 174, 175, and 176 in response to the earlier "load shift register" command from the sequencer 42. The sequencer also loads a B and C bit into register 185 to indicate whether or not a B or C bus is to be used.

The B bit, C bit, and other information from registers 174, 175, and 176 are also presented to a parity generator 186 so that at the end of the data, specifically on bits 15 and 16, parity information is sent out to be used as a check by the circuit selector to determine whether a proper transmission was received.

The data from register 185 goes out along with the clock pulses through the secondary or primary interface that has been enabled by decoder 182. The information from registers 173, 174, 175, 176 and 177 is also presented to control panel display 93 and is used in a conventional manner to drive an LED display indicating the numbers that have been chosen by the operator to identify the circuit selector, the TAM, and the number of the circuit in the TAM.

The type of circuit chosen, as stored in register 177 is also presented to control panel access jack field 94 and, in the preferred embodiment, is used to operate lights indicating the type of circuit chosen. This is explained in greater detail with respect to FIG. 26.

DESCRIPTION OF THE CIRCUIT SELECTOR

A schematic diagram of a typical circuit selector is presented in FIG. 11. The circuit selector receives the data and clock from line selector 19 and generates the status information which is reviewed by the sequencer. As the description of the following circuits proceeds, the derivation of each of the status signals will be explained.

As can be seen in FIG. 11, the data from line selector 19 is presented to a 16-bit serial-in-parallel-out shift register 201. The clock information also arrives at register 201 after it passes through a validity of clock check and timing generator 202. It is contemplated that in the preferred embodiment of my invention, the clock and data will be transmitted by the special method contemplated in my co-pending patent application entitled "Two Wire Synchronous Transmission Circuit with Electrical Isolation", filed Nov. 18, 1975,Ser. No. 632,973.

Validity of clock check an timing generator 202 is explained more fully in FIG. 12. The incoming 16 clock pulses are presented to a pulse width discriminator 252 and a gate 256. If the predetermined width of each clock pulse is correct, discriminator 252 passes it through to turn on a 1 millisecond retriggerable one-shot 254. The timing of retriggerable one-shot 254 is such that each pulse should arrive in time to keep it turned on as long as the 16 clock pulses are coming in. The output of one-shot 254 is shown in FIG. 13 by waveform 254. The signal from one-shot 254 holds gate 256 open during the reception of the 16 clock pulses. The clock pulses pass through gate 256 and advance shift register 201 so as to load the incoming data. The turning on of one-shot 254 also triggers a pulse output from a one microsecond one-shot 282 as shown by the waveform in FIG. 13. This pulse clears a preset counter 258 which begins to count the incoming clock pulses from gate 256. Preset counter 258 produces an output in response to 16 and only 16 pulses. This signal, which indicates that the number of clock pulses is correct, goes to a gate 276 in FIG. 11. Gate 276 produces an output indicating a transmission error if it does not receive the signal from counter 258.

When one-shot 254 turns off it triggers an end of data one-shot 284 to produce the waveform shown in FIG. 13. This pulse indicates the end of the data and is used in FIG. 11 to produce two strobe or clock pulses at differing times. Also when one-shot 254 turns off, it triggers a 110 millisecond one-shot 203 to indicate that a "not ready" condition exists for a predetermined period of time. Finally, one-shot 284 operates to reset a continuity flip-flop 210 in preparation for the continuity check on the about to be selected TAM.

In FIG. 11 the end of data pulse passes through a gate 280 provided that gate 280 is not inhibited by either a TAM busy, transmission error, or shutdown signal. Passing through gate 280 the pulse operates a gate 279 and produces a strobe pulse to initiate a selection in the bus storage registers. This strobe pulse is produced only if gate 279 is not inhibited by a clear mode signal from the data decoder 200 which is decoding the data received from register 201. At the same time, the end of data pulse from gate 280 is presented to a gate 273 which gate 273 in enabled by the clear mode signal from data decoder 200. The output of gate 273 passes through an OR gate 295 and returns to the data decoder 200 to operate a TAM select decoder 274 and a number of circuit in TAM decoder 264 which will be described in FIG. 15.

If data decoder 200 is not producing a clear mode signal the system is assumed to be in the access mode. The lack of a clear mode signal is inverted by an inverter 289 to signal an access and enable a gate 290. Gate 290 receives the end of data pulse somewhat delayed by a 50 millisecond one-shot 291. The output of one-shot 291 is shown in FIG. 13. When one-shot 291 turns off it triggers one-shot 293 to send a pulse through gate 290. The output of gate 290 is shown in FIG. 13. This access mode clock pulse also passes through OR gate 295 to activate the TAM select decoder 274 which enables one of the number of circuit in TAM decoders 264.

The clock pulse from gate 290 also operates a delayed one-shot 275 which, after 20 milliseconds, sends a second pulse out through OR gate 295 to trigger a test in the number of circuit in TAM decoder 264 which confirms if the access has been made. If it has, the second pulse and a return signal on line 214A operate gate 214 to set a flip-flop 277 which signals line selector 19 that the access is complete.

The output pulse from one-shot 293 is also presented to a gate 271 in combination with an enable signal from the clear mode line to produce a register reset signal, the function of which is to signal a clearing action as described later.

Power up master reset 205 operates (whenever the power is turned on from power supply 204) to reset all storage registers and flip-flops, as shown by box 216, and to reset flip-flop 277. Reset 205 can also be manually operated by the remote reset signal from line selector 19 delivered over line 25. Power up master reset 205 produces another output on line 206 which goes through OR gate 208 to reset continuity flip-flop 210.

A NAND gate 276 produces a transmission error signal if it does not receive a signal indicating that the number of clock pulses is correct, or if it does not receive a signal indicating that the parity is correct, or if it does not receive a signal indicating that the correct bus has been chosen. This transmission error signal is directed back to the line selector 19 and is also used to inhibit gate 280 as indicated earlier.

As mentioned earlier, each of these problem signals or status signals is generated from various parts of the circuit which are described subsequently. In FIG. 11, however, it can be seen that the shutdown signal is produced by the TAM interface circuits 220. This shutdown signal, which indicates an electrical component malfunction, is used both in the circuit selector as shown in FIG. 11 and is directed back to the line selector 19. A TAM interface continuity check (which is described in detail in FIG. 19) is also performed in TAM interface circuits 220 to produce an output on line 15 and operate continuity flip-flop 210 to indicate if there is a problem with TAM continuity. Finally, it may also be seen in FIG. 11 that the TAM busy signal from data decoder 200 is also directed back to line selector 19 to be reviewed with the rest of the status information.

DATA DECODER OPERATION

Figure 15:
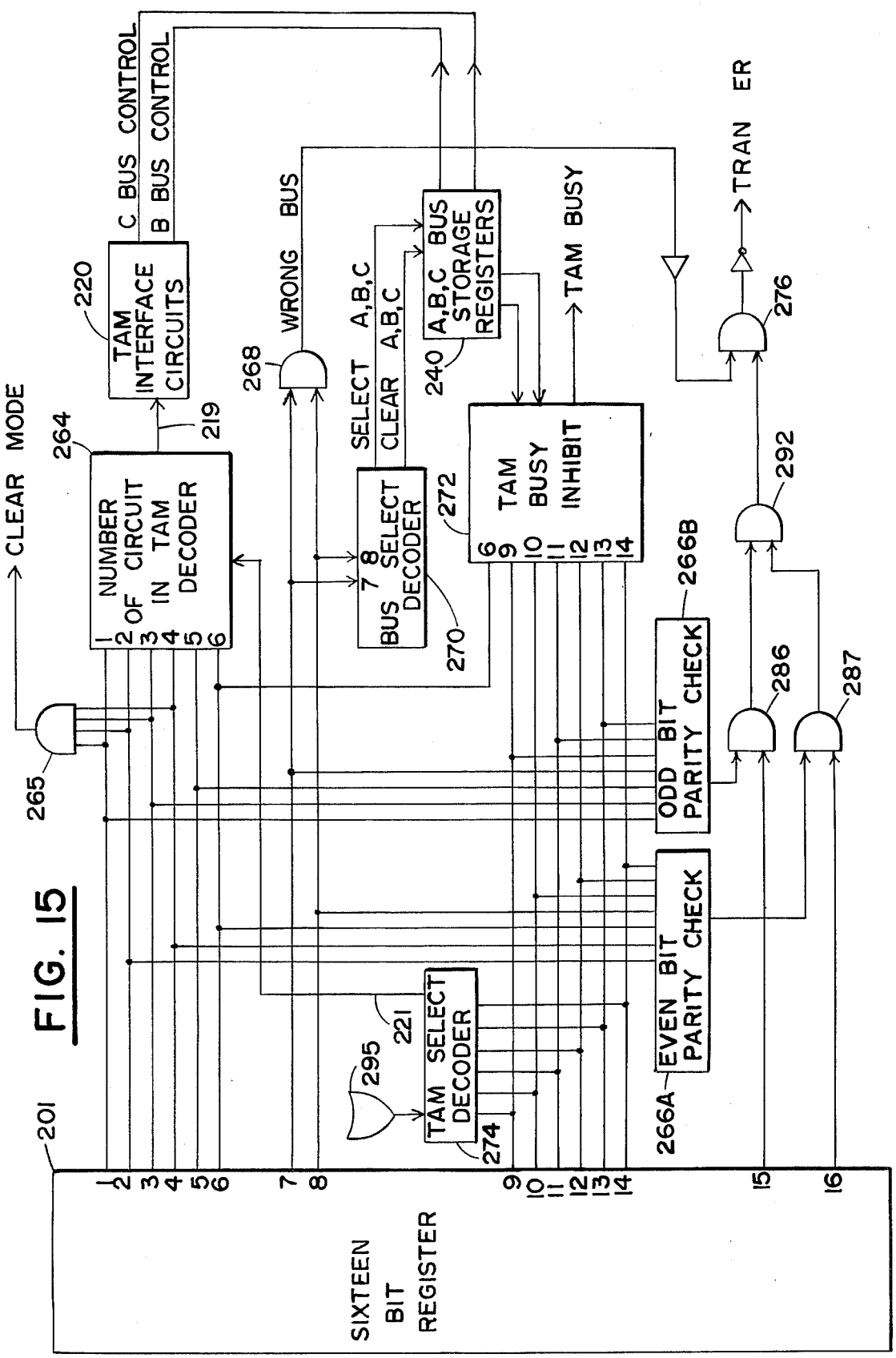

The data decoder 200 is shown generally in FIG. 14, and more specifically in FIG. 15. As described earlier 16 clock pulses and, accordingly, 16 data bits are used to identify the communication line which is to be accessed and the bus (A, B, or C) which is to be used. To better understnd the operation of the data decoder it is useful to know which bits are used for which task. The first six bits identify the number of the circuit in the TAM with bits 1 through 4 representing the units digit, bit 6 indicating whether the communication line is in group I or group II, and bit 5 telling which half of the chosen group the circuit is in. This division will be explained in detail in FIGS. 19 and 21.

Bits 7 and 8 determine which bus will be used to route the communication line back to the test position. The exact code is shown in the code table of FIG. 16.

Bits 9 through 14 identify the number of the TAM with bits 9 through 12 indicating the units digit and bits 13 and 14 indicating the tens digit. The last two bits, numbers 15 and 16, are used for parity checks.

In FIG. 14 parallel-out shift register 201 supplies data to a number of specific elements in data decoder 200, namely: the number of the circuit in the TAM decoder 264, the TAM select decoder 274, a clear mode decoder 265, a bus select decoder 270, a TAM busy inhibit 272, a parity check 266, and a wrong bus decoder 268. Bus select decoder 270 controls a set of A, B, and C bus storage registers 240 causing them to compare data being received by TAM busy inhibit 272 with other previous accesses that are still in use. If a match is made, a busy signal is transmitted back to the test position indicating to the operator that he should attempt to access a different circuit. In addition, if the B bus or C bus has been chosen the identifying data indicating the number of the TAM and which group of the TAM is to be used is sent on to the TAM interface circuit 220 on a B bus control line, if that is chosen, or on a C bus control line if C bus is chosen.

TAM select decoder 274 operates in response to a signal from OR gate 295 (as described with respect to FIG. 11) and sends out an enable signal on one lead of an enable bus 221 to the correct "number of circuit in TAM decoder" 264. The system of the present invention employs a plurality of decoders 264, one for each TAM although only one decoder 264 is shown in FIGS. 14 and 15.

FIG. 15 shows data decoder 200 in somewhat more specific form with the 16 outputs of shift register 201 numbered top to bottom for identification. TAM select decoder 274 is connected to bits 9 through 14 so as to decode the selected TAM. In the preferred embodiment, up to twenty different TAM's may be used. Thus, enable bus 221 has 20 leads going to twenty decoders 264. Decoder 274 sends a signal on one of these leads to enable the correct "number of circuit in TAM" decoder 264. Decoder 274 operates in response to either reception of a clear mode clock signal in the clear mode or, an access mode clock signal in the clock mode both of which are received through OR gate 295.

Number of circuit in TAM decoder 264 is connected to bits 1 through 6 so as to decode the number of the circuit. This is explained more fully in FIG. 19.

The clear mode decoder 265 comprises a gate connected to bits 1 through 4. When the operator wishes to clear the circuit, the sequencer causes register 176 in FIG. 10 to transmit four zeros on bits 1 through 4 and this is detected by AND gate 265 to produce a clear mode signal.

Figures 16, 17:
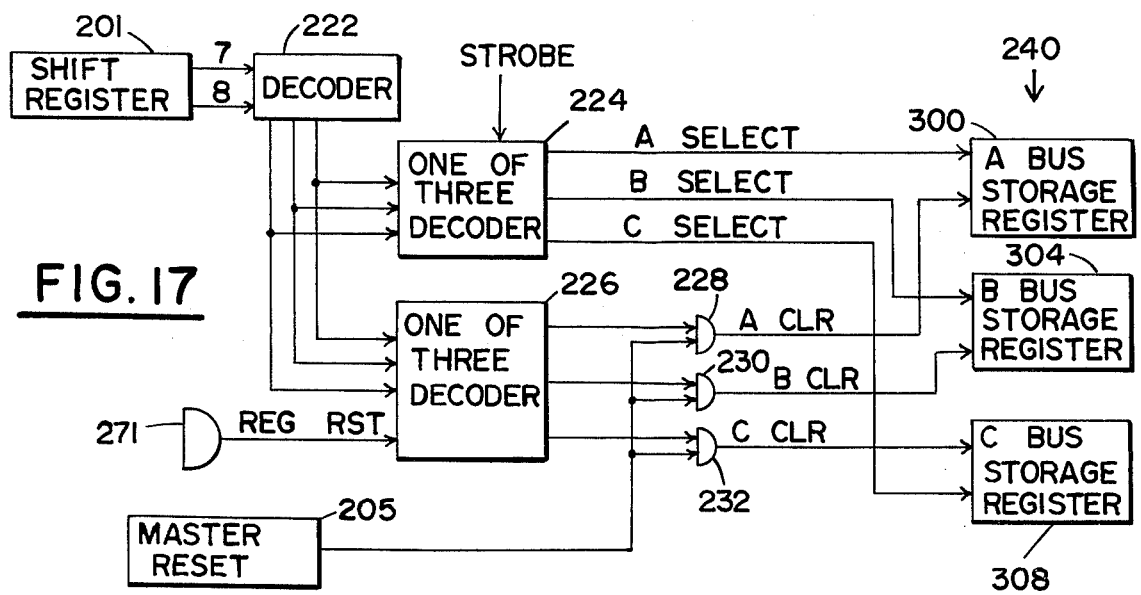

Bits 7 and 8 are directed to the bus select decoder 270 which decodes the bits in accordance with the code table of FIG. 16 to select either the A, B, or C bus storage registers. If the system is in the clear mode, decoder 270 clears the A, B, or C bus storage registers. In FIG. 16 it can be seen that if both bits 7 and 8 are logical "ones" an incorrect code has been received. A NAND gate 268 in FIG. 15 detects this and produces a wrong bus signal which is coupled back through an inverter to gate 276 to produce a transmission error signal.

TAM busy inhibit 272 is connected to bits 6 and 9 through 14 so as to decode the TAM being selected (bits 9 through 14) and which group in the TAM is selected (as determined by bit 6) and compare that to the information in the A, B, and C bus storage registers 240 to determine if the selected TAM and the group are in use. If so, a TAM busy signal is produced.

Finally, an even bit parity check 266A is connected to the even bits while an odd bit parity check 266B is connected to the odd bits. Gate 286 compares the odd bits with bit 15 which contains the odd bit parity information. Gate 287 compares the even bit parity with bit 16 which contains the even bit parity information. If both of these match gates 286 and 287 both have outputs which causes gate 292 to have an output indicating that parity is correct. If no match is present, however, this is coupled through gate 276 as a transmission error.

BUS SELECT DECODER OPERATION

Bus select decoder 270 is explained in detail in FIG. 17. Bits 7 and 8 are received from shift register 201 by a decoder 222 which decodes the binary information in accordance with the table of FIG. 16 to produce an output on one of three leads corresponding to A, B, or C bus. These leads branch and go to a one of three decoder 224 and another one of three decoder 226. Decoder 224 passes the strobe pulse from gate 279 in FIG. 11 to either A bus storage register 300, B bus storage register 304, or C bus storage register 308 depending upon the selection of decoder 222. This enables the bus storage registers to receive data from the TAM busy inhibit 272. After the data has been examined to see if there is a busy condition (a match of data) and after the bus has been selected, the desired circuit is accessed. When he has completed his test the operator will send a clearing signal and this produces the register reset signal received from gate 271 in FIG. 11. This is passed through by decoder 226 to clear out register 300, register 304, or register 308 depending upon the selection of decoder 222. OR gates 228, 230, and 232 permit registers 300, 304, and 308 to also be cleared by the master reset 205.

TAM BUSY INHIBIT AND BUS STORAGE REGISTER OPERATION

Figure 18:
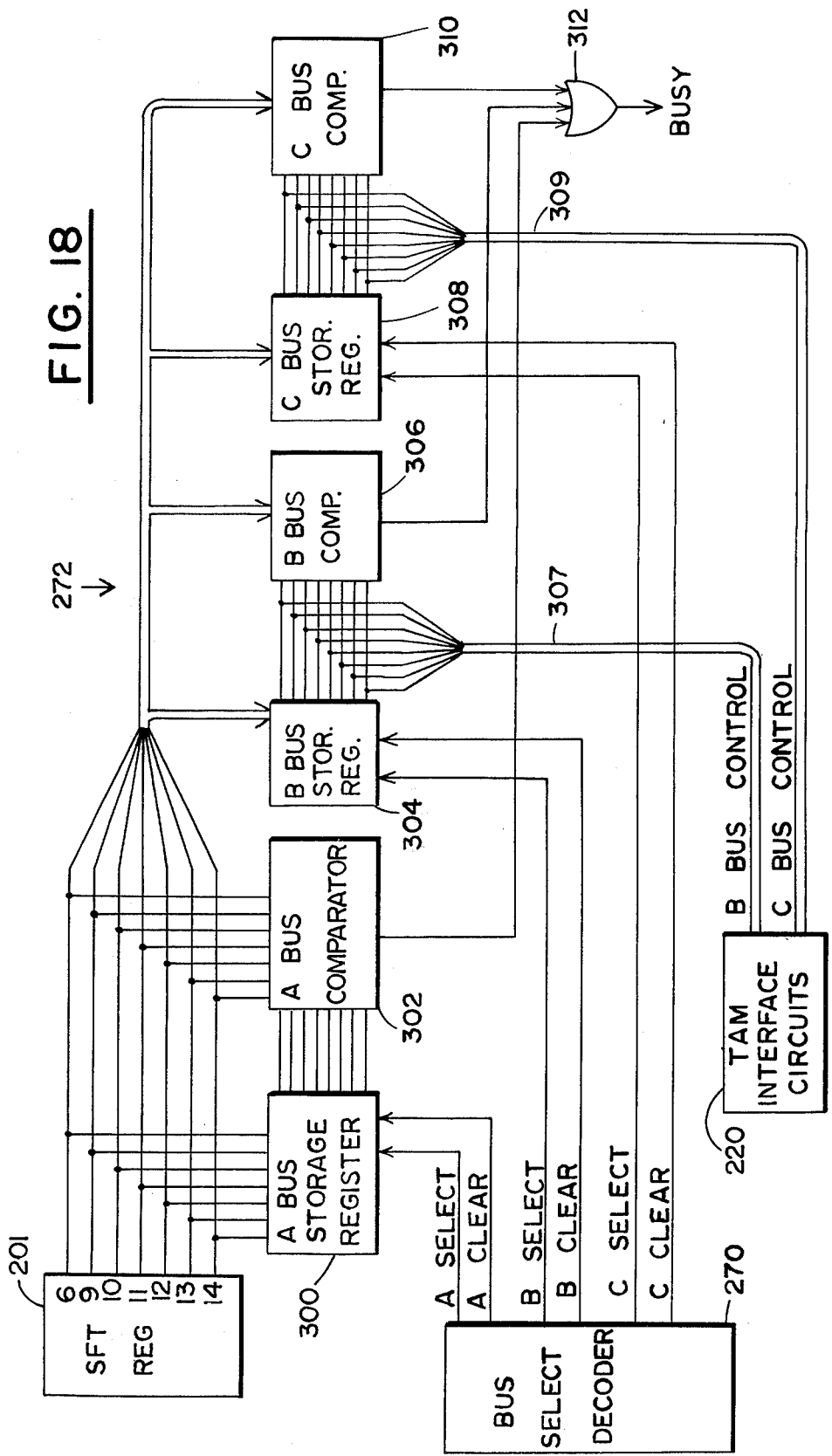

Reference should be had to FIG. 18. Data representing which group in which TAM is being accessed or cleared is presented on bits 6 and 9 through 14. These bits are received by the TAM busy inhibit 272 which includes the A, B, and C bus storage registers 300, 304, and 308. TAM busy inhibit 272 also includes an A bus comparator 302, a B bus comparator 306, and a C bus comparator 310 connected to receive this data. The bus chosen by the operator is decoded by the bus select decoder 270 which selects and enables one of the three bus storage registers. The storage registers load the information relating to the selected TAM and the selected group in the TAM. If, during the accessing and testing intervals the same group and TAM is selected again, either by the original operator or another operator, the information identifying the group and TAM will arrive at the comparators and be matched with the data in the storage registers. The matched data indicates that the group and TAM is busy and a signal is produced by the appropriate comparator. All three comparators A, B, and C have outputs through and OR gate 312 to produce the busy signal.

Each operator is normally connected to his circuit selector by means of an A bus of which he has the exclusive use. Accordingly, it is not necessary to effect a connection to bus A. If bus A is in use, however, the operator may choose to use B bus or C bus. Alternatively, some other operator may request access from the circuit selector by means of the B bus or C bus. This is done by transmitting the correct code for the B or C bus and activating the appropriate storage register in TAM busy inhibit 272. Once the B or C bus storage register is enabled the data identifying the selected group and TAM is stored therein and passed on to the bus select switching circuits of FIG. 25. For example, if B bus is selected, the data is passed through B bus storage register 304, over a cable 307, to the TAM interface circuits 220 which contain the bus select switching circuits. If the C bus is chosen, storage register 308 is enabled to store and pass the data identifying the group and TAM on cable 309 to the TAM interface circuits.

NUMBER OF CIRCUIT IN THE TAM DECODER OPERATION

Figure 19:
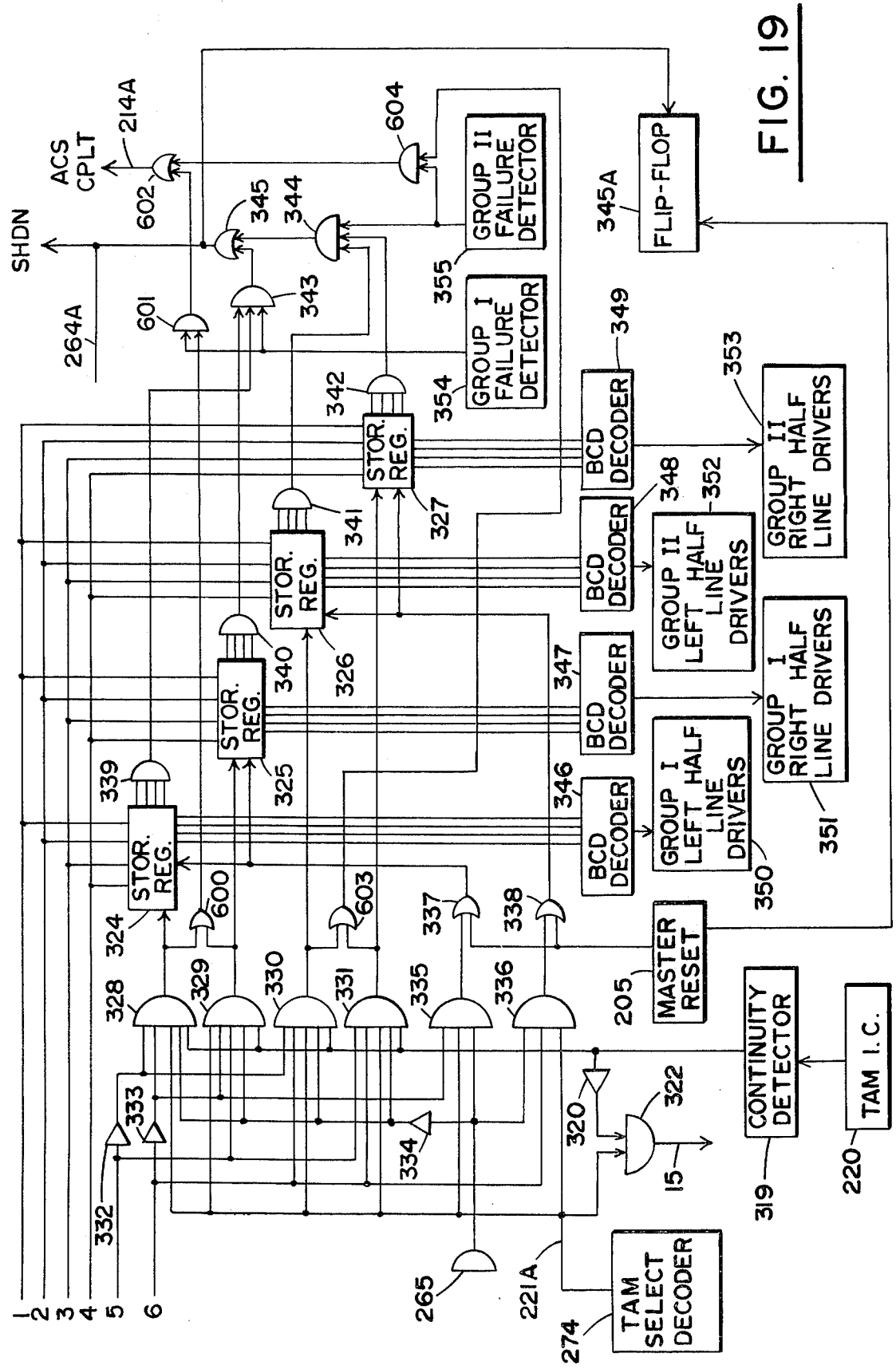

The last element in data decoder 200, namely, the number of circuit in TAM circuit decoder 264, is explained in detail in FIG. 19. In the preferred embodiment as many as twenty of these decoders may be used within a single circuit selector. As mentioned with respect to FIG. 15, the TAM select decoder 274 produces a clock or enable signal on one lead of an enable bus 221 in order to enable one of the decoders 264. In FIG. 19, the one selected lead is identified as 221A. The signal on line 221A enables the gates numbered 322, 328, 329, 330, 331, 335, and 336.

Gate 322 is used to pass a TAM continuity signal to line 15 in the circuit selector. This signal is derived from a continuity detector 319 which detects whether or not a voltage is being received through the plug-in connections to the TAMs as described in FIGS. 21 and 24. If the voltage is detected, a signal is produced which goes to gates 328, 329, 330, and 331 to enable them in conjunction with the clock signal on line 221A. If there is no signal from continuity detector 319 the gates are not enabled. The lack of signal is transformed by an inverter 320 into a positive signal which goes out on line 15 to indicate a TAM continuity problem.

Gates 328 through 331 are further enabled by the absence of a clear mode signal from gate 265 as indicated by an inverter 334. Thus, these four gates operate only when there is continuity, when the system is in the access mode (no clear mode), and when the clock signal is received indicating that this particular decoder 264 should be in operation. Gate 328 enables storage register 324 corresponding to the group I, left half line drivers 350. Gate 329 enables storage register 325 corresponding to the group I, right half line drivers 351.

Gates 330 and 331 operate storage register 326 and 327 respectively corresponding to the group II, left and right half line drivers 352 and 353 respectively. A brief reference to FIG. 21 will show that each TAM has 12 relay access cards divided into groups I and II. Each of the two groups is further divided into left and right halves. Returning to FIG. 19 is should be remembered that bit 6 determines which group the selected circuit is in. Thus, bit 6 is connected to gates 330 and 331 directly in order to activate the group II line drivers, and connected to gates 328 and 329 through an inverter 333 in order to activate the group I line drivers. Since bit 5 determines which half of the selected group is desired, it is connected directly to gates 329 and 331 corresponding to the right halves and further connected to gates 328 and 330 through an inverter 332 to activate the left half. The code identifying the units digit number of the circuit is present on bits 1 through 4 and directed to all four storage registers 324 through 327. The data is stored only in the storage register enabled by bits 5 and 6. The binary data is decoded by the corresponding BCD decoder 346, 347, 348, or 349 and an output produced on one of nine lines to activate the appropriate line drivers as indicated by boxes 350 through 353. The operation of the line drivers themselves is explained later with respect to FIG. 20.

The system is cleared out by means of gates 335 and 336 which are enabled by the clock signal on line 221A and by the clear mode signal coming from gate 265. Gate 335 is further enabled by means of a connection from inverter 333 so as to be operable in response to a signal indicating that the group I line drivers should be cleared. The output of gate 335 is connected through an OR gate 337 to clear registers 324 and 325 corresponding to the group I line drivers. Likewise gate 336 is enabled directly from bit 6 and operates through OR gate 338 to clear out registers 326 and 327 corresponding to the group II line drivers. OR gates 337 and 338 permit all of the registers to be cleared by the master reset 205 as well.

In FIG. 20 a group I failure detector 354 and a group II failure detector 355 are explained in detail. These failure detectors indicate that one of the line drivers is in operation which should not be the case if the corresponding storage register has been cleared out. Consider for a moment storage register 324. A clearing signal involves logical "ones" on all four bits 1 through 4. AND gate 339 is connected to the four outputs from storage register 324 which comprise the opposite polarity from the four outputs going to BCD decoder 346. Thus, four "zeros" in storage register 324 produce four "one" outputs to gate 339. THe presence of all four "one" outputs causes an output from gate 339 indicating that the register has been cleared. Likewise, AND gate 340 produces an output when storage register 325 has been cleared and these two outputs are presented to a gate 343 to enable it. If gate 343 also receives a signal from the group I failure detector 354, it indicates that a transistor is conducting in group I when it should not be. Therefore, the output of gate 343 is directed through an OR gate 345 to produce a shutdown signal. All of the number of circuit in TAM decoders 264 are connected together by a line 264A so that a shutdown from any one of them is combined as shown in FIG. 19. In a similar manner, AND gates 341 and 342 sense when storage registers 326 and 327 have been cleared and enable a gate 344. Thus, a signal from group II failure detector 355 produces a shutdown signal through OR gate 345.

Any shutdown signal automatically operates a flip-flop 345A which operates a relay 345B as shown in FIG. 20 to cut off the 48 volt power to the line drivers so as to be sure no telephone line is opened by a shorted line driver within groups 369 and 370.

When the second enable or clock pulse arrives on line 221A from delayed one-shot 275 (FIG. 11) it will also be directed to the storage register enabled by bits 5 and 6. If this is either register 324 or 325 the pulse passes through an OR gate 600 to enable gate 601. If the circuit has been accessed, a line driver will have turned on producing a signal from detector 354 corresponding to group I. Thus, gate 601 produces an "access complete" signal through an OR gate 602 and line 214A. In a similar manner, an OR gate 603 and an AND gate 604 produce an "access complete" signal for group II.

LINE DRIVER OPERATION

In FIG. 20 the line drivers of FIG. 19 are explained in greater detail. Decoder 264 produces a group I set of outputs and a group II set of outputs. The group I outputs are divided into nine left outputs 350 and nine right outputs 251 while the corresponding group II outputs are divided into left outputs 352 and right outputs 353. To avoid complexity and redundancy only the left outputs from group I are shown in any detail.

Output 350A goes to a line driver 360 to turn on a transistor 361 which then turns on a transistor 362. The output of transistor 362 is used to operate a relay in one of the 12 relay access cards 363A. (The relay access cards are explained in detail in FIG. 22).

As transistor 362 begins to conduct it also turns on a transistor 372. The flow of current through transistor 372 activates a transistor 354 which comprises the group I failure detector. If a transistor is operating because of a command from detector 264 there, in fact, is no electronic failure, and the group I failure detector 354 signal is blocked by gate 343 in FIG. 19. If, however, the transistor is conducting because of, say, an internal short, a shutdown signal is produced.

The single line driver enclosed by dashed line 360 is grouped with two other identical line drivers 364 and 365 to form a group of three line drivers 366. These three line drivers 366 are associated with just one relay access card 363A. Two more groups of three line drivers 367 and 368 operate two more relay access cards 363B. These are combined with the group in dashed line 366 to form the left half, group I, nine line drivers 369. All of the nine line drivers enclosed by dashed line 369 are duplicated in a right group of nine line drivers 370 which are driven by the nine output leads 351. Thus, it may be seen that there are a total of 18 group I line drivers operating to drive a total of six relay access cards 363.

The group II outputs from decoder 264 operate through left and right halves 352 and 353 to turn on a group of 18 line drivers 371 which drive six group relay access cards 363D. Line drivers 371 also have a failure detector 355 which operates in the manner described earlier.

TAM OPERATION

The six group I and six group II relay access cards together form one test access module 12 as shown in FIG. 21. Each relay access card has three leads coming in from the line drivers through the TAM interface circuits 220. The group I driver leads are identified by line 382 in FIG. 21 while the group II driver leads are identified by line 383. Group I and II drivers connect to the TAM via a 20 pair cable. Each relay access card 363 has eighteen test circuit leads which connect through relays to the telephone circuits being accessed. To cut down on wiring the eighteen leads from the group I relay access cards are connected together in parallel as indicated by box 375 while the group II relay access cards are brought into parallel connections in box 376. The 18 leads from group I (380) and 18 leads from group II (381) go back to TAM interface circuits 220 via a second 20 pair cable. The TAM interface circuits 220 direct these leads back to the test position as described with respect to FIG. 24.

To test TAM continuity, a voltage is produced in the TAM interface circuits 220 and directed out on line 384 in the first 20 pair cable, through the test access module 12, and back again by means of line 385 in the second 20 pair cable to decoder 264 (in TAM interface 220). There the continuity detector 319 checks to see if the voltage is present. In this way it is determined if test access module 12 is properly connected.

RELAY ACCESS CARD OPERATION

One relay access card is shown in FIG. 22. For the purposes of explanation, this relay access card may be considered to be the one connected to the group of three line drivers 366 in FIG. 20 and numbered 363A. The relay access card 363A incorporates three switch circuits numbered 390, 391, and 392. Each switch circuit is connected to the line side of the telephone lines 10 and the drop side 13. Only switch circuit 390 is examined in detail, again, to avoid complexity in the drawing.

Switch circuit 390 is activated by a signal from line driver 360 which is brought on line 360A into three identical six-pole switches 393, 394 and 395. Each six-pole switch operates to disconnect the line from the drop side and instead loop the telephone circuits out to the test position. Each of the six-pole switches incorporates three sets of identical contact points which are shown as small squares 396. Only one set of contact points 396A are described in detail and they are shown in FIG. 23.

In FIG. 23 the signal from line driver 360 operates a relay 397 in the six-pole switch 395 which works through dashed connections 398 and 399 to mechanically move the make before break double switches 400 and 401. The normally open contacts indicated by the crosses 400 are designed to make contact before their corresponding normally closed contacts 401 open. Two sets of contacts are used for redundancy so as to make sure the connections between the line side 10 and the drop side 13 cannot possibly be broken before the test loop is established. Once the contacts are completed the circuit is looped from the line side 10 up through the pair of test leads 402A and back down into the drop side 13.

Nine switches of the type shown in FIG. 23 are included in each switch circuit on the relay access card so that nine pairs of test leads 402 are directed up to parallel wiring 377. It should be noted that only eight pairs of test leads 402 are needed to access the eight wire circuit. The ninth pair is used to access a "make busy" (MB) lead and a "security" (S) lead. The MB lead comes from the telephone network switch. An optional switch on the relay access card can be used to busy out the switch network for this circuit. The S lead originates in the relay access card. An optional switch on the card may be used to switch the S lead to ground indicating to the control panel that this circuit should not be tested when accessed.

Nine more pairs of test leads from switch circuits 391 and 392 are brought together and parallel wired to produce the 18 leads 377 shown in FIGS. 21 and 22.

FIG. 22A shows an additional feature wherein a separate plug-in circuit board card 363B can be substituted for relay access card 363A. Card 363B is hard wired with jacks 403 to permit a craftsman to make direct connection accesses to the communication lines. A typical jack wiring for one of the circuits is shown by jacks J1 and J2.

TAM INTERFACE CIRCUIT OPERATION

The preferred embodiment contemplates as many as 20 access modules and, therefore, there could be as many as 20 TAM interface circuits, one for each TAM. The TAM interface circuit, as shown in FIG. 24, comprises the group I and II line drivers, which were already described in FIG. 20, and the A, B, or C bus select switching 410 which is described in FIG. 25. Each TAM interface circuit is connected to its assigned TAM and receives information from the data decoder 200. The bus select switching 410 routes the group I and group II loops from its corresponding TAM out through buses A, B, or C as determined by the signals from bus storage registers 304 and 308. A voltage generated in bus select switching 410 travels through continuity line 384, through the test access module as described earlier and out line 385 to be detected in decoder 264. Meanwhile, decoder 264 operates as described with respect to FIG. 19 to operate the correct group I and group II line drivers and actuate the corresponding relay on the relay access card by means of lines 382 and 383.

BUS SELECT SWITCHING OPERATION

The bus select switching circuit 410 is shown in detail in FIG. 25. Since there is a cable interface circuit for each TAM, there is a bus select switching circuit 410 for each TAM. Each circuit is identical in design but coded to its individual TAM by the location at which it is inserted. For example, if the circuit of FIG. 25 is plugged in at location four, corresponding to TAM number 4, the tabs 417 on the circuit board are inserted into a circuit board connector 418. Connector 418 has the first two leads grounded with the third lead (indicative of a binary four) open. The remaining leads are also grounded. Thus, connector 418 is wired to present the binary code for number four directly to any circuit board plugged in at that location. The code is conveyed through plug 417 to comparators 414 and 416. The incoming data representing the selected TAM on bits 9 through 14 is compared with the hard wired data from connector 418 to determine if this particular TAM has been selected. If the B bus is selected the data arrives on calbe 307 and is routed to comparator 416. A match produces an output which enables gates 422 and 423. If the C bus is selected the information arrives on cable 309 and activates comparator 414 to enable gates 420 and 421. Bit 6 determines which group is to be selected and accordingly bit 6 for the B bus is directed to gate 423 to signal connection of group II to the B bus. Inverted bit 6 from inverter 424 is presented to gate 422 to signal connection of group I to the B bus. Bit 6 for the C bus is directed to gate 420 to signal connection of group II to the C bus. Inverted bit 6 from inverter 424A is presented to gate 421 to signal connection of group I to the C bus. If either gate 421 or 422 is activated their outputs are passed through an OR gate 429 to operate a relay 430. Relay 430 operates a multipole switch 431 so as to direct the group I TAM circuits 375 away from bus A and into multipole switch 433 where they normally pass through to bus B. If gate 421 is the one activated, corresponding to the C bus selection, then relay 428 is also activated which operates multipole switch 433 to further switch the group I circuits from B bus into C bus.

If either of gates 420 or 423 is activated its output is passed through an OR gate 426 to operate relay 427 which in turn operates multipole switch 432. Switch 432 directs the group II TAM circuits 376 for position number four away from the normal A bus and into multipole switch 434 where they would normally pass through into the B bus, If, however, the C bus has been selected, then gate 420 is activated and this operates relay 425 which operates multipole switch 434 to further direct the group II circuits into C bus.

Returning to FIG. 24 it may now be seen that the circuits from the selected TAM pass back through their corresponding TAM interface circuits 220 to be sent back to the line selector 19 over buses A, B, or C depending upon the input information from storage registers 304 and 308. When the circuits are completed back to the line selector 19 they are routed through the primary or secondary interfaces into the test bus 501 and from there into the control panel access jack field 94 which is described in detail in FIG. 26.

CONTROL PANEL ACCESS JACK FIELD OPERATION

In FIG. 26 access jack field 94 is shown with test bus 501 entering from the left. Two of the eighteen test bus leads go directly to detectors 524 and 525 to sense the so called MB (make busy) lead and S (security) lead. The MB lead identifies whether or not the accessed circuit is busy and the S lead is used for security purposes to prohibit test of circuits that are temporarily restricted. The remaining 16 test bus leads are divided into four groups of four of which only the uppermost four are described in detail.

The two incoming or line side leads have a monitor 502 across them. Likewise monitors 503, 504, and 505 are connected to the other three groups. By the use of the monitor the operator can listen to the line to determine if the line is in use. If not, he can then proceed to plug in his test equipment at the jacks 520, 521, 522, or 523. The particular jacks he uses depend upon whether he is checking a two, four, six, or eight wire circuit. Also it is possible that he might have a direct connection to his test equipment through electronic switches rather than making a manual connection with jacks. In any case, after he is sure that the circuit is continuous he operates the test switch on his control panel which operates a test flip-flop 124 which was described with respect to the control panel interface 91 in FIG. 7. Flip-flop 124 enables a series of gates 507, 508, 509, and 510. which of these gates produces an output is dependent upon a type of circuit decoder 506 which receives data from the address interface type circuit register 177 whose operation was explained in FIG. 10. Register 177 indicates the type of circuit (2, 4, 6, or 8)

which is to be accessed and this is decoded by decoder 506 and used to enable the selected correct gates 507 through 510. Decoder 506 also operates indicator lights 500 which are mounted in the control panel display 93 to illuminate, in the preferred embodiment, lights adjacent the individual four jacks 520 through 523. This tells the operator which of the jack sets he will be using to test the circuit. Gates 507 through 510 operate normal relays 511, 512, 513, and 514 respectively. Each of these relays operates a set of contacts which break the loop by means of a mechanical connection 516 and complete the connection to the jacks by means of a mechanical connection 515. For the lower three circuits in FIG. 26 the switches are identified only by the boxes 517, 518, and 519. Activation of normal relay 511, 512, 513, or 514 may also close a switch that grounds the MB lead to make it "busy".

AUTOMATIC SELECTION OF ALTERNATE TEST POSITION

In FIG. 27, an alternative embodiment is disclosed in which the operator does not choose an alternate test position with a control panel switch. Instead he simply inserts the code for the desired line and the system selects the correct circuit selector automatically. This is done with a connection 25A from the primary interface 32 to input D on the multiplexer 132 in sequencer 42. Thus, if the primary interface is enabled this is signaled directly back to the sequencer. If the primary interface is not enabled is may be presumed that an alternate test position has been selected. The switches 65 and 66 (FIG. 4), which give the primary access to B and C buses, are eliminated in this embodiment to simplify operation reducing flexibility somewhat.

It is altogether clear from the foregoing description that many variations are possible in the circuits described herein without departing from the spirit and scope of the invention and therefore I intend to be bound only to the embodiments as defined by the following claims.

I claim:
1. A system for accessing communication lines from a remote position comprising electronic access circuit selecting means at the communication lines and remote line selecting means at the remote position;
   said access circuit selecting means having line selection data decoding means connected to operate access switching means, said switching means operable to connect a selected communication line to a selected transmission bus which transmission bus is routed to the remote line selecting means, and said access circuit selecting means further having automatic, sequentially programmed status determining means connected to said data decoding means and said access switching means and operable to direct status information to the remote line selecting means;
   said remote line selecting means having status reviewing means connected to said status determining means and line selection data encoding means connected to said reviewing means and to said decoding means, said encoding means operable upon the reception of appropriate status information from the access circuit selecting means to transmit line selection data to the decoding means, and manual line selection data entry means at the remote position to supply line selection data to the encoding means.

2. The system of claim 1 including additional remote line selecting means connected to said access circuit selecting means through said remote line selecting means;
   and also including additional access circuit selecting means associated with said additional remote line selecting means, with at least some of said additional access circuit selecting means connected to said remote line selecting means.

3. The system of claim 2 in which said remote line selecting means is connected through a local primary interface to both the access circuit selecting means and to remote secondary interface means, which remote secondary interface means are located in and connected to said additional remote line selecting means.

4. The system of claim3 including local secondary interface means located in and connected to said remote line selecting means, said local secondary interface means being connected to said additional remote line selecting means through a primary interface in said additional remote line selecting means.

5. The system of claim 4 including an alternate test position selecting means to choose whether to access through said access circuit selecting means or through one of said additional access circuit selecting means.

6. The system of claim 5 in which said status reviewing means comprises an automatic controller circuit which first sequentially examines the status information from the access circuit selecting means if that is selected with the alternate test position selecting means or which secondly sequentially examines the status information from the additional access circuit selecting means if that is selected with the alternate test position selecting means.

7. The system of claim 6 in which the first sequential examination of status information is through said local primary interface and the second sequential examination of status information is through the local secondary interface.

8. The system of claim 1 including additional remote line selecting means connected to said access circuit selecting means through said remote line selecting means.

9. The system of claim 8 in which said additional remote line selecting means also have status reviewing means with line selection data encoding means connected thereto, said encoding means operable upon the reception of appropriate status information from the access circuit selecting means to transmit line selection data thereto, and manual data entry means connected to the encoding means.

10. The system of claim 9 in which said additional remote line selecting means is connected through local secondary interface means, located in the additional remote line selecting means, and through a primary interface means in said remote line selecting means to the access circuit selecting means.

11. The system of claim 10 including additional access circuit selecting means associated with the additional remote line selecting means.

12. The system of claim 11 in which said additional access circuit selecting means also have line selection data decoding means connected to operate access switching means, said switching means operable to connect a selected communication line to a selected transmission bus which bus is routed to the additional remote line selecting means, and said additional access circuit selecting means also having status determining means connected to the decoding means and switching means operable to direct status information to the additional remote line selecting means.

13. The system of claim 12 in which said additional remote line selecting means is connected to the additional access circuit selecting means through a primary interface located in the additional remote line selecting means, which primary interface also permits connection to the additional access circuit selecting means by said remote line selecting means through a secondary interface at the remote line selecting means.

14. The system of claim 13 including, in the remote line selecting means and the additional remote line selecting means, an alternate test position selecting means to choose whether to access through said access circuit selecting means or through one of said additional access circuit selecting means.

15. The system of claim 14 in which said status reviewing means comprises an automatic controller circuit which first sequentially examines the status information from the access circuit selecting means, if that is selected with the alternate test position selecting means, or which secondly sequentially examines the status information from the additional access circuit selecting means, if that is selected with the alternate test position selecting means.

16. The system of claim 15 in which the first sequential examination of status information is through said local primary interface and the second sequential examination of status information is through the local secondary interface.

17. The system of claim 16 in which said access switching means includes a large plurality of circuit looping switches subdivided into a plurality of test access modules.

18. The system of claim 17 in which said line selection data decoding means includes test access module decoding means, number of circuit in test access module decoding means, bus select decoding means, and test access module busy decoding means.

19. The system of claim 18 in which said test access module busy decoding means comprises storage registers to store data representing previously accessed circuits and comparators to compare new data with the stored data and generate a busy status signal in response to a match.

20. The system of claim 19 in which the bus select decoding means determines which storage register is used to store data in the test access module busy decoding means.

21. The system of claim 20 in which the number of circuit in test access module decoding means comprise a plurality of number decoders, one for each test access module, each of which is enabled by said test access module decoding means, said number decoders driving corresponding sets of line drivers to activate the looping switches in the test access modules.

22. The system of claim 21 in which said access switching means further comprises bus select switching means to route the accessed circuit from the looping switches to the selected transmission bus, which bus select switching means operate in response to data from the storage registers in the test access module busy decoding means.

23. The system of claim 22 including a first continuity checking circuit through each test access module connected to a detector in each number decoder, which detectors direct a first continuity status signal to the remote line selecting means.

24. The system of claim 22 including an electronic component failure detecting circuit in each set of line drivers to produce a shutdown status signal for the remote line selecting means status reviewing means.

25. The system of claim 22 including transmission error decoding and detecting means in the access circuit selecting means to produce a status signal for the status reviewing means.

26. The system of claim 24 including relay means to turn off said line drivers in response to a shutdown status signal.

27. The system of claim 24 including an access complete detecting circuit connected to said failure circuit and said number of circuit in test access module decoding means to produce an access complete status signal for the status reviewing means.

28. The system of claim 17 including additional circuit boards with hard wired jacks connected thereto and adapted to be plugged in to the locations which normally receive said circuit looping switches in order to allow the communications lines to be accessed directly at the access circuit selecting means.

29. The system of claim 22 including a second continuity checking circuit through cables, which cables provide the connections between the access circuit selecting means and the remote line selecting means, to provide a second continuity status signal to the remote line selecting means.

* * * * *